US011859820B1

(12) United States Patent
Hong et al.

(10) Patent No.: US 11,859,820 B1
(45) Date of Patent: Jan. 2, 2024

(54) GAS TURBINE COMBUSTION SECTION HAVING AN INTEGRATED FUEL CELL ASSEMBLY

(71) Applicant: General Electric Company, Schenectady, NY (US)

(72) Inventors: Seung-Hyuck Hong, Clifton Park, NY (US); Richard L. Hart, Broadalbin, NY (US); Honggang Wang, Clifton Park, NY (US); Anil Raj Duggal, Niskayuna, NY (US); Michael Anthony Benjamin, Cincinnati, OH (US); Andrew Wickersham, Liberty Township, OH (US); Narendra Digamber Joshi, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/984,669

(22) Filed: Nov. 10, 2022

(51) Int. Cl.
*F23R 3/00* (2006.01)
*H01M 8/04089* (2016.01)
(Continued)

(52) U.S. Cl.
CPC ............... *F23R 3/002* (2013.01); *F23R 3/28* (2013.01); *H01M 8/04074* (2013.01);
(Continued)

(58) Field of Classification Search
CPC .... F23R 3/002; F23R 3/28; F23R 3/40; F02C 3/20; H01M 8/04089; H01M 8/2457;
(Continued)

(56) References Cited

U.S. PATENT DOCUMENTS

| 3,658,279 A | 4/1972 | Robertson |
| 3,805,517 A | 4/1974 | Sewell et al. |

(Continued)

FOREIGN PATENT DOCUMENTS

| CN | 106976405 A | 7/2017 |
| DE | 102005012230 A1 | 10/2005 |

(Continued)

OTHER PUBLICATIONS

Co-Pending U.S. Appl. No. 17/307,784, filed May 4, 2021.
(Continued)

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A combustion section defines an axial direction, a radial direction, and a circumferential direction. The combustion section includes a casing that defines a diffusion chamber. A combustion liner is disposed within the diffusion chamber and defines a combustion chamber. The combustion liner is spaced apart from the casing such that a passageway is defined between the combustion liner and the casing. A fuel cell assembly is disposed in the passageway. The fuel cell assembly includes a fuel cell stack that has a plurality of fuel cells each extending between an inlet end and an outlet end. The inlet end receives a flow of air and fuel and the outlet end provides output products to the combustion chamber. The outlet end of the plurality of fuel cells extends through the combustion liner and partially defines the combustion chamber.

20 Claims, 12 Drawing Sheets

(51) Int. Cl.
*H01M 8/2457* (2016.01)
*F23R 3/28* (2006.01)
*H01M 8/04007* (2016.01)

(52) U.S. Cl.
CPC ..... *H01M 8/04089* (2013.01); *H01M 8/2457* (2016.02); *H01M 2250/20* (2013.01)

(58) Field of Classification Search
CPC ......... H01M 8/2454; H01M 2250/407; H01M 2250/20; H01M 8/04761
See application file for complete search history.

(56) References Cited

U.S. PATENT DOCUMENTS

| | | |
|---|---|---|
| 4,684,081 A | 8/1987 | Cronin |
| 5,227,256 A | 7/1993 | Marianowski et al. |
| 5,366,819 A | 11/1994 | Hartvigsen et al. |
| 5,541,014 A | 7/1996 | Micheli et al. |
| 5,573,867 A | 11/1996 | Zafred et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,118,818 B2 | 10/2006 | Agnew et al. |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,034,511 B2 | 10/2011 | Yanagisawa |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,882,865 B2 | 11/2014 | Johnston |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,414,269 B2 | 9/2019 | Bemis et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2* | 7/2020 | Shapiro ............... H01M 8/2428 |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,239,470 B2 | 2/2022 | Hart et al. |
| 11,332,256 B2 | 5/2022 | Hon et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2004/0234837 A1* | 11/2004 | Dan ................. H01M 8/2432 |
| | | 429/514 |
| 2006/0010866 A1 | 1/2006 | Rehg et al. |
| 2006/0280979 A1* | 12/2006 | Tsunoda ................ F01D 15/10 |
| | | 429/479 |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0094202 A1 | 4/2012 | Rethore |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0255733 A1 | 9/2014 | Masset et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2015/0226122 A1* | 8/2015 | Duesing .................. F23R 3/002 |
| | | 60/39.19 |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0263873 A1* | 8/2020 | Boardman .............. F23R 3/286 |
| 2020/0313207 A1 | 10/2020 | Milcarek et al. |
| 2021/0003281 A1 | 1/2021 | Amble et al. |

(56) References Cited

U.S. PATENT DOCUMENTS

| | | | |
|---|---|---|---|
| 2021/0075034 A1 | 3/2021 | Irie et al. | |
| 2021/0115857 A1 | 4/2021 | Collopy | |

FOREIGN PATENT DOCUMENTS

| | | | |
|---|---|---|---|
| EP | 3805107 A1 | 4/2021 | |
| JP | 2009187756 A | 8/2009 | |
| JP | 2011002308 A | 1/2011 | |
| JP | 101777320 B1 | 9/2017 | |
| JP | 2018087501 A | 6/2018 | |
| KR | 20090064853 A | 6/2009 | |
| WO | WO2018108962 A1 | 6/2018 | |
| WO | WO2020/011380 A1 | 1/2020 | |

OTHER PUBLICATIONS

Co-Pending U.S. Appl. No. 17/307,780, filed May 4, 2021.
Babu D et al., Optimization of Pattern Factor of the Annular Gas Turbine Combustor for Better Turbine Life, IOSR Journal of Mechanical and Civil Engineering, pp. 30-35.
Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.
Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se14.1.33175.
Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.
Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.
Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.
Thorud, Dynamic Modelling and Characterisation of a Solid Oxide Fuel Cell Integrated in a Gas Turbine Cycle, Trondheim, NTNU, Oct. 2005, 278 Pages.
Turbine Engine Relighting in Flight, Certification Memorandum, CM-PIFS-010, European Aviation Safety Agency (EASA), Issue 1, Apr. 29, 2015, 6 Pages.
Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/19/sofc_for_aircraft_pnnl 2012.pdf.

* cited by examiner

GAS TURBINE COMBUSTION SECTION HAVING AN INTEGRATED FUEL CELL ASSEMBLY

FIELD

The present disclosure relates to a gas turbine engine having a combustion section with an integrated fuel cell assembly.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
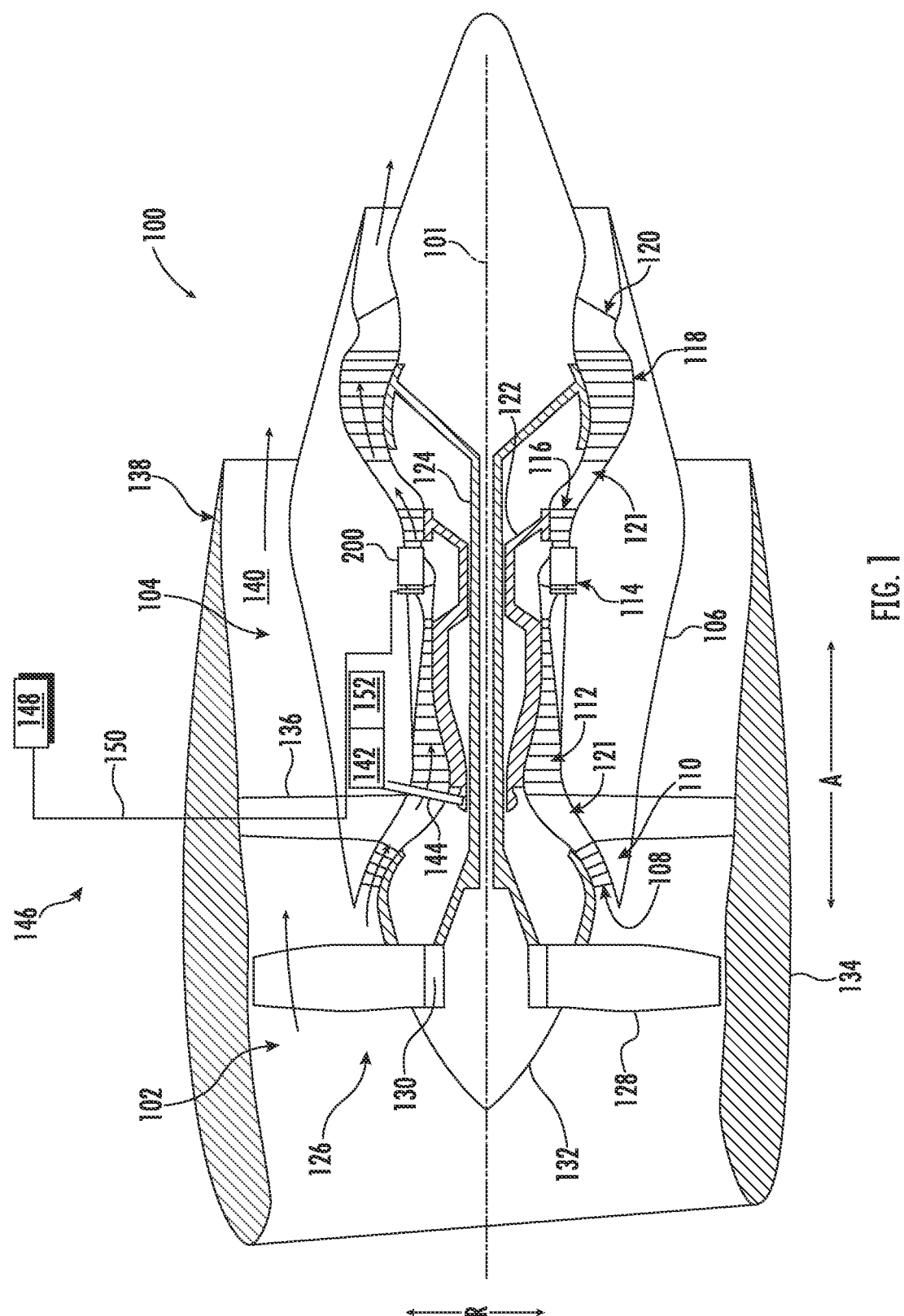
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The present disclosure is generally related to a gas turbine engine having a combustion section with an integrated fuel cell assembly. The combustion section includes a casing defining a diffusion chamber, and a combustion liner is disposed within the diffusion chamber and defines a combustion chamber. The combustion liner is spaced apart from the casing such that a passageway is defined between the combustion liner and the casing, and the fuel cell assembly is disposed within the passageway.

The fuel cell assembly includes a fuel cell stack having a plurality of fuel cells. The plurality of fuel cells receive air from the diffusion chamber and fuel from a fuel source and generate a power output. The unused air and fuel is delivered to the combustion section as output products of the plurality of fuel cells.

The fuel cell stack described herein advantageously leverages the pressure difference between the diffusion chamber and the combustion chamber to produce an airflow path through the fuel cell stack. In addition, one or more of the fuel cells in the fuel cell stack may be angled relative to a radial direction of the combustion section, which allows the fuel cells to extend axially a maximum length for maximum power production from the fuel cells. Further, the fuel cell stack may advantageously define a portion of the combustion chamber and may include one or more cooling features that provide a cooling flow of air to the combustion liner and/or the fuel cells.

The turbomachine of the present disclosure includes a more robust and efficient integration of the fuel cell assembly into the combustion section, which advantageously increases the hardware life of the fuel cell assembly and increases the overall efficiency of the turbomachine.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine 100 further includes one or more drive shafts. More specifically, the turbofan engine 100 includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. For the embodiment shown, the accessory gearbox 142 is located within the outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations, and may further provide power back to the turbofan engine 100 during other operations. For example, the accessory gearbox 142 is, for the embodiment depicted, coupled to a starter motor/generator 152. The starter motor/generator 152 may be configured to extract power from the accessory gearbox 142 and turbofan engine 100 during certain operation to generate electrical power, and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine 100 depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
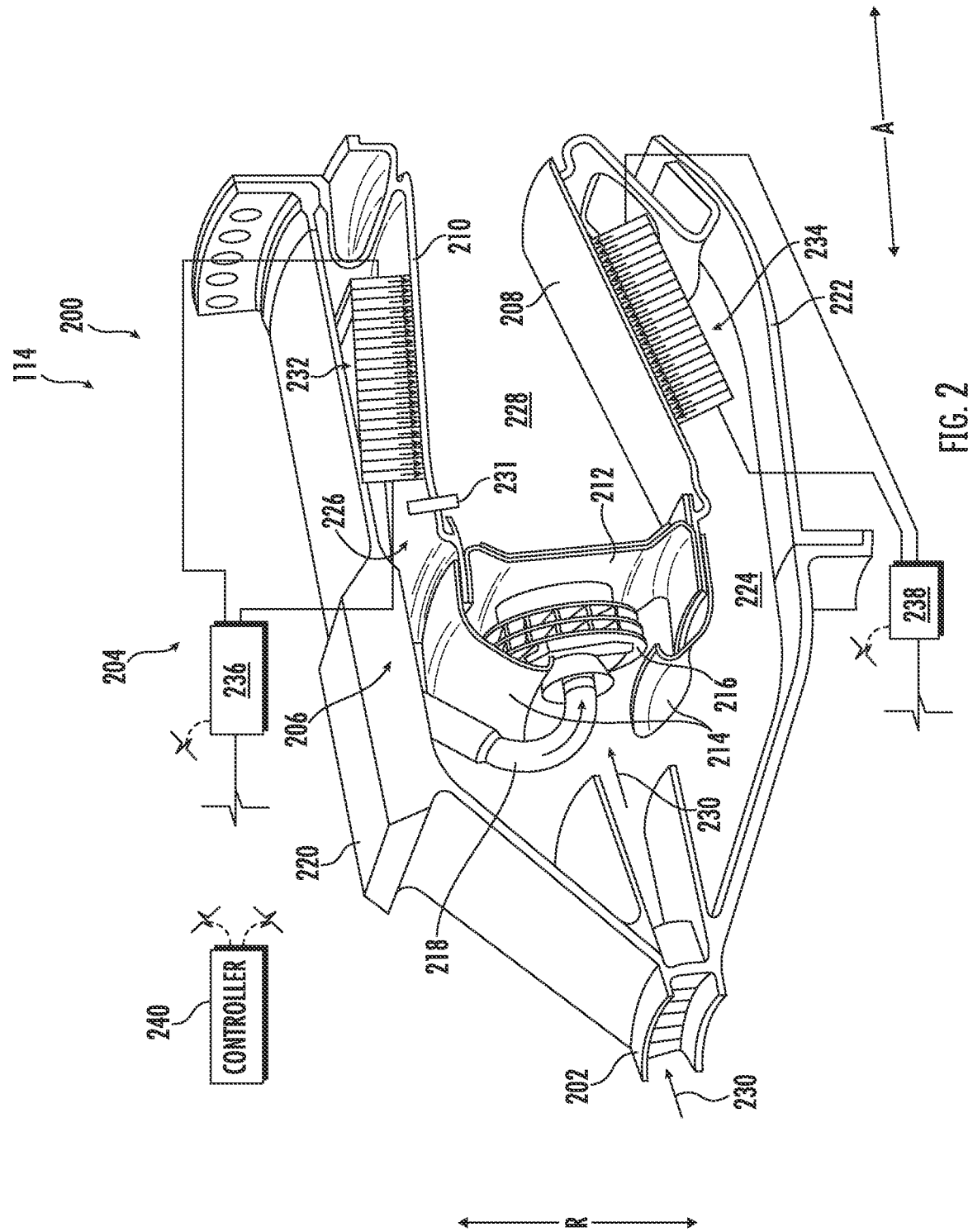
FIG. 2 is a perspective view of an integrated fuel cell and combustor assembly in accordance with the present disclosure.

Referring now to FIG. 2, illustrated schematically is a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner liner 208, the outer liner 210, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below with reference to FIG. 5).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 5.

Figure 3:
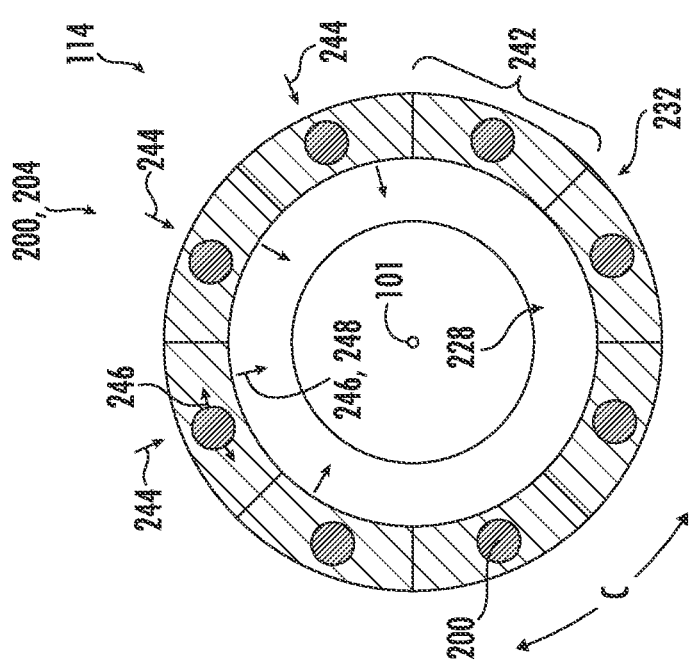
FIG. 3 is a schematic, axial view of the exemplary integrated fuel cell and combustor assembly of FIG. 2.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Figure 4:
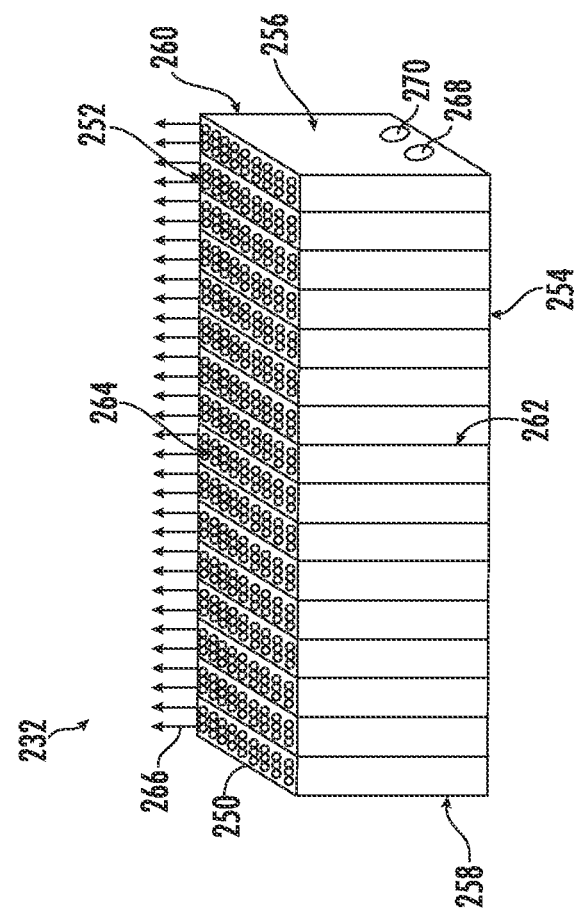
FIG. 4 is a schematic view of a fuel cell of a fuel cell assembly in accordance with an exemplary aspect of the present disclosure as may be incorporated into the exemplary integrated fuel cell and combustor assembly of FIG. 2.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258 and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel 244 and air 246 (FIG. 3) that is not consumed by the fuel cells inside the housing 250 of the first fuel cell stack 232. The combustion gas 266 is provided to the combustion chamber 228 (FIG. 3) and burned during operation to generate combustion gasses used to generate thrust for the gas turbine engine 100 (FIG. 1) (and vehicle/aircraft incorporating the gas turbine engine 100).

The fuel and air inlet side 256 includes one or more fuel inlets 268 and one or more air inlets 270. Optionally, the one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below with reference to FIG. 5. Each of the one or more air inlets 270 is fluidly coupled with a source of air for the fuel cells, such as air that is discharged from a compressor section and/or an air processing unit as is also described further below. The inlets 268, 270 separately receive the fuel and air from the external sources of fuel and air, and separately direct the fuel and air into the fuel cells.

Figure 5:
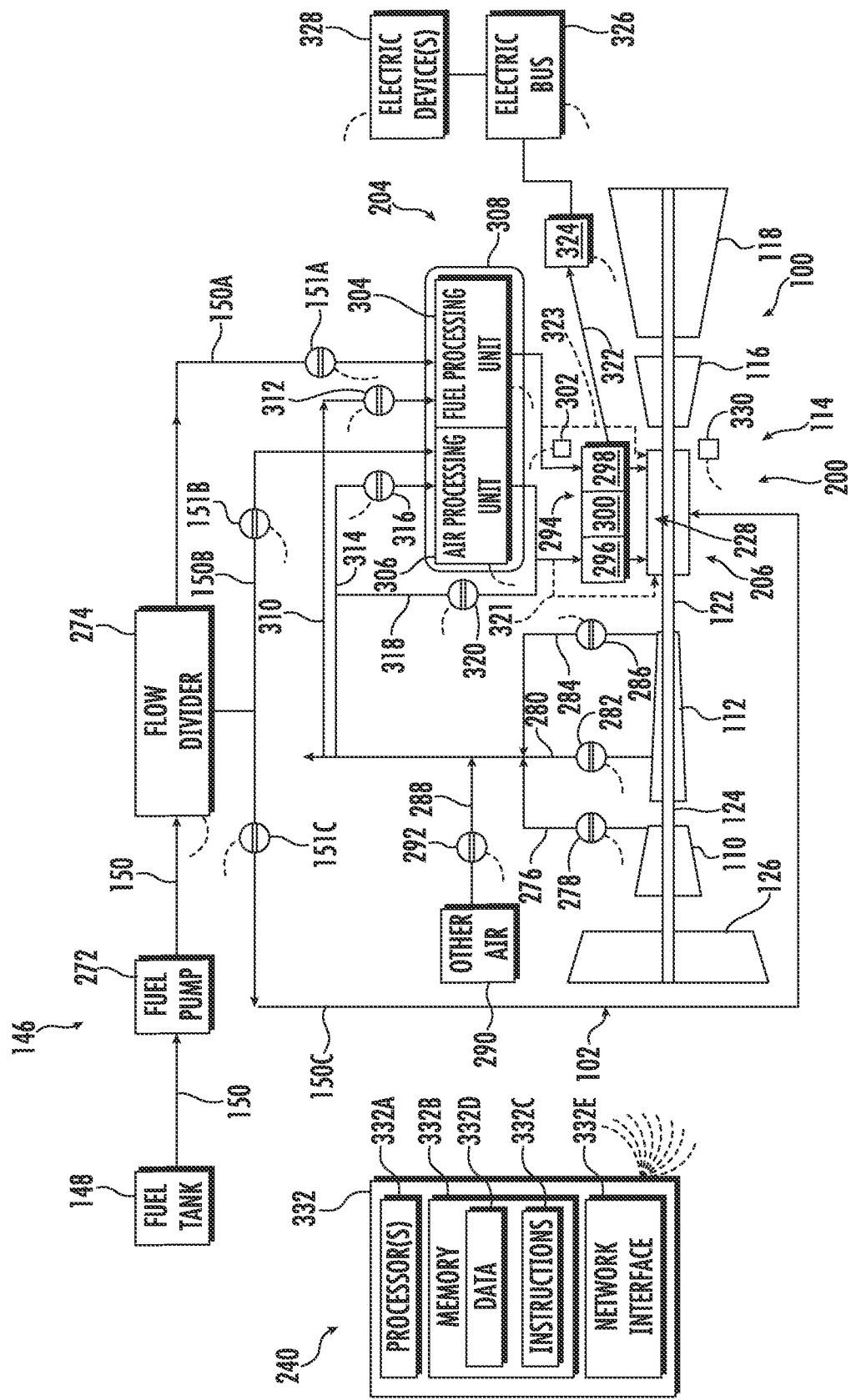
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., within the cathode side 296 or anode side 298 of the fuel cell).

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of a combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor ($CPO_x$) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit 306 includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell 294 to allow a portion or all of an airflow conditioned by the air processing unit 306 (and combined with any bypass air through cathode bypass air duct 318) to bypass the cathode side 296 of the fuel cell 294 and go directly to the combustion chamber 228. The bypass duct 321 may be in thermal communication with the fuel cell 294. The fuel cell assembly 204 further includes a fuel bypass duct 323 extending around the fuel cell 294 to allow a portion or all of a reformed fuel from the fuel processing unit 304 to bypass the anode side 298 of the fuel cell 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electrical devices 328 may include the starter motor/generator 152 (FIG. 1) of the gas turbine engine 100.

Referring still to FIG. 5, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to various the sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of outputs (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system, as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 6:
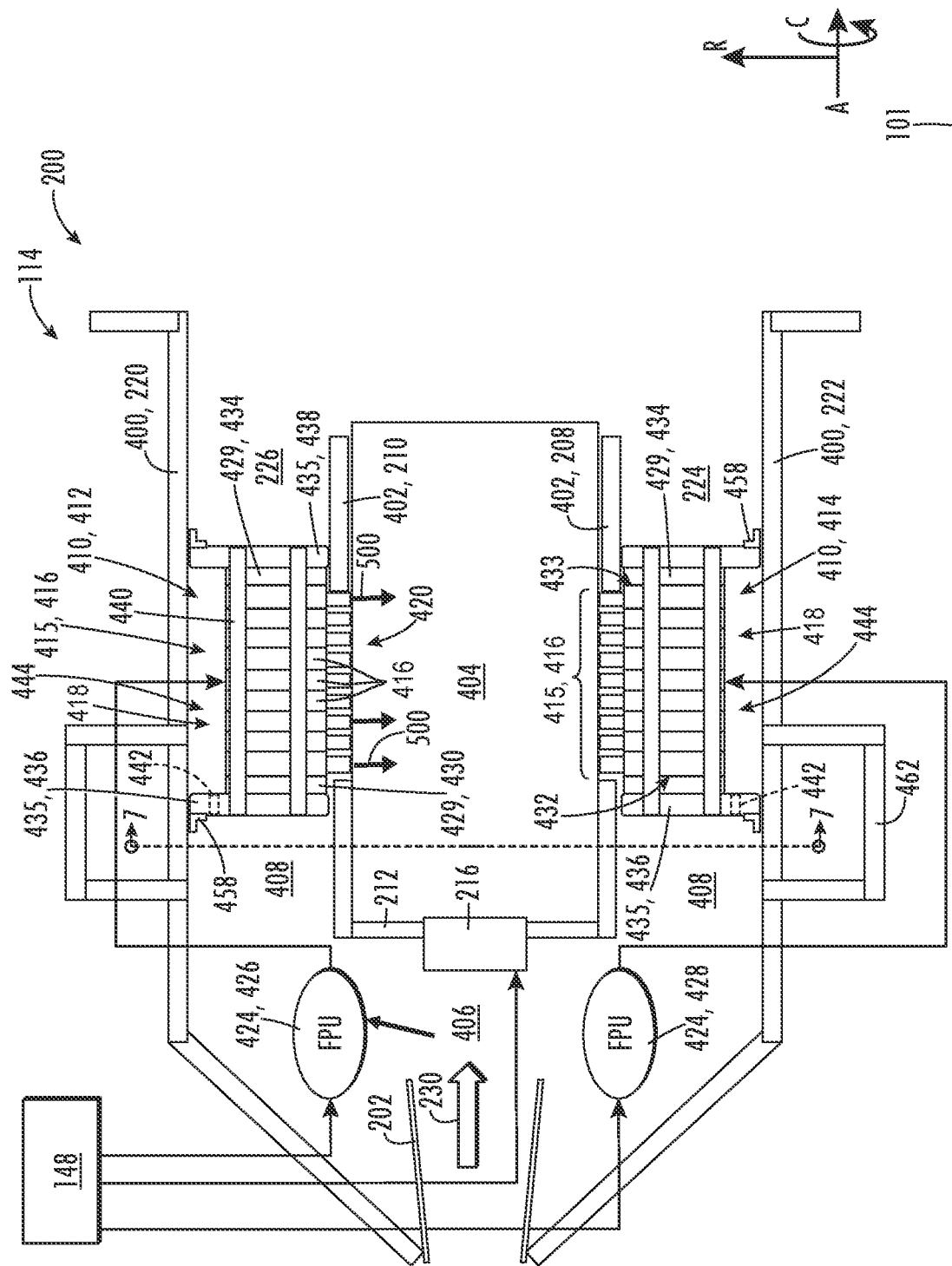
FIG. 6 is a cross-sectional view of a portion of a combustion section including a portion of the integrated fuel cell and combustor assembly in accordance with embodiments of the present disclosure.

Referring now to FIG. 6, illustrated is a cross sectional view of a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

The combustion section 114 includes a casing 400 and a combustion liner 402. The casing 400 includes the inner casing 222 and/or the outer casing 220, and the combustion liner includes the inner liner 208 and the outer liner 210. The casing 400 defines a diffusion chamber 406 that receives high pressure air from the compressor section via the compressor diffuser nozzle 202. Particularly, the diffusion chamber 406 may be defined collectively by the inner casing 222, the outer casing 220, the inner liner 208, and the outer liner 210. The combustion liner 402 (including both the inner liner 208 and the outer liner 210) may be disposed in the diffusion chamber 406 and may define (e.g., at least partially define) a combustion chamber 404. For example, the combustion chamber 404 may be collectively defined by the inner liner 208, the outer liner 210, and the dome assembly 212.

In many embodiments, the combustion liner 402 may be spaced apart (e.g., radially spaced apart) from the casing 400 such that a passageway 408 is defined between the combustion liner 402 and the casing 400. As shown in FIG. 6, passageway 408 may form a portion of the diffusion chamber 406 (or may be in fluid communication with the diffusion chamber 406). The inner casing 222 and inner liner 208 define the inner passageway 224 therebetween, and the outer casing 220 and outer liner 210 define the outer passageway 226 therebetween. Both the inner passageway 224 and the outer passageway 226 may form a portion of the diffusion chamber 406.

The dome assembly 212 is disposed proximate the upstream end of the combustion section 114 (i.e., closer to the upstream end than the downstream end), and the dome assembly 212 may define an upstream boundary of the combustion chamber 404. The dome assembly 212 includes an opening (not labeled) for receiving and holding the main fuel nozzle or swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1. The swirler assembly 216 may receive air from the diffusion chamber 406 and fuel from the fuel flowline 218 and mix the fuel and air together before injecting it into the combustion chamber 404. The swirler assembly 216 may be disposed at a forward end of the combustion liner 402, and the swirler assembly 216 may be fluidly coupled to the fuel source 148, the diffusion chamber 406, and the combustion chamber 404.

During operation, the compressor diffuser nozzle 202 is configured to direct a compressed fluid 230 from the compressor section to the diffusion chamber 406, where the compressed fluid 230 is configured to be mixed with fuel within the swirler assembly 216 and combusted within the combustion chamber 404 to generate combustion gasses. The combustion gasses are provided to the turbine section to drive one or more turbines of the turbine section (e.g., the high pressure turbine 116 and low pressure turbine 118).

In exemplary embodiments, the combustion section 114 further includes a fuel cell assembly 410 disposed in the passageway 408. As shown, in some embodiments, the fuel cell assembly 410 may be disposed in the outer passageway 226. Alternatively, or additionally, the fuel cell assembly 410 may be disposed in the inner passageway 224. For example, the combustion section 114 may include a first, fuel cell assembly 412 disposed in the outer passageway 226, also referred to herein as an outer fuel cell assembly, and a second fuel cell assembly 414 disposed in the inner passageway, also referred to herein as an inner fuel cell assembly. In many embodiments, the fuel cell assembly 410 may be disposed aft of the swirler assembly 216 within the passageway 408.

The fuel cell assembly 410 may include a fuel cell stack 415 having a plurality of fuel cells 416. The plurality of fuel cells 416 may be coupled to one another and may extend between an inlet end 418 and an outlet end 420. Particularly, the plurality of fuel cells 416 may extend from the inlet end 418, which is in fluid communication with the diffusion chamber 406 and the fuel source 148, to the outlet end 420 that extends through the combustion liner 402 and is in fluid communication with the combustion chamber 404. For example, the inlet end 418 may receive a flow of air and fuel and the outlet end 420 may provide output products 500 to the combustion chamber 404. For example, the inlet end 418 of the plurality of fuel cells 416 may be fluidly coupled to the fuel source 148 and the diffusion chamber 406, such that the inlet end 418 receives a flow of fuel from the fuel source 148 and a flow of air from the diffusion chamber 406.

Figure 13:
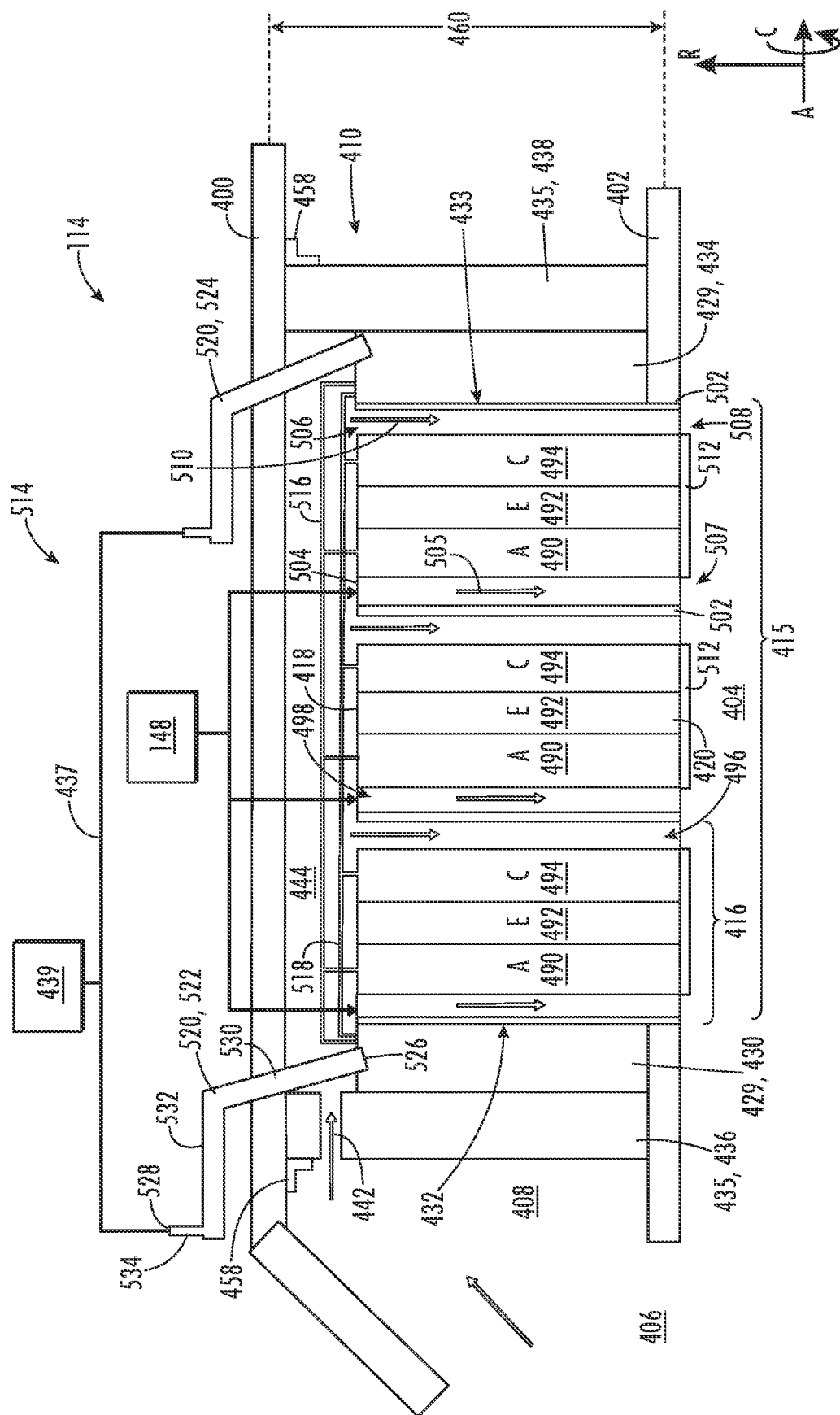
FIG. 13 is an enlarged cross-sectional view of a portion of a combustion section including a fuel cell assembly in accordance with embodiments of the present disclosure.

In certain embodiments, fuel cell assembly 410 may include at least one electrically conducting member 429 at either a forward end 432 or an aft end 433 of the fuel cell stack 415. For example, the fuel cell assembly 410 may include a first electrically conducting member 430 at the forward end 432 of the fuel cell stack 415 and a second electrically conducting member 434 at the aft end 433 of the fuel cell stack 415. The first electrically conducting member 430 may be in contact with a forwardmost fuel cell in the plurality of fuel cells 416, and the second electrically conducting member 434 in contact with an aftmost fuel cell in the plurality of fuel cells 416, such that the fuel cell stack 415 is disposed between (e.g., axially between) the first electrically conducting member 430 and the second electrically conducting member 434. The first electrically conducting member 430 and the second electrically conducting member 434 may be electrically coupled to the plurality of fuel cells 416 in the fuel cell stack 415, to collect or capture a power output of the fuel cell stack 415. For example, as shown in FIG. 13, at least one of the first electrically conducting member 430 or the second electrically conducting member 434 may be electrically coupled to a power convertor 439 via an electric bus 437 (such as the power convertor 324 described above with reference to FIG. 5 or a different power convertor).

In many embodiments, the fuel cell assembly 410 may further include at least one structural member 435 that couples the fuel cell assembly 410 to at least one of the casing 400 and/or the combustion liner 402 of the combustion section 114. The at least one structural member 435 may include a first structural member 436 and a second structural member 438. The fuel cell stack 415 and the electrically conducting members 430, 434 may be disposed between (e.g., axially between) the first structural member 436 and the second structural member 438. The first structural member 436 may be coupled to the first electrically conducting member 430 and may extend (generally radially) between the casing 400 and the combustion liner 402. Similarly, the second structural member 438 may be coupled to the second electrically conducting member 434 and may extend (generally radially) between the casing 400 and the combustion liner 402.

The first structural member 436 and the second structural member 438 may be formed from a non-conductive, electrically insulating, material, such that the electrically conducting members 430, 434 are not in electrical communication with the structural members 436, 438. In some embodiments, the structural members 436, 438 may include an electrically insulating wrap and/or coating. Additionally, in many embodiments, one or more cross-supports 440 may extend between, and couple to, the first structural member 436 and the second structural member 438. For example, the one or more cross-supports 440 may extend generally axially from the first structural member 436 to the second structural member 438. In many embodiments (not shown), the one or more cross-supports 440 may extend axially between the structural members 436, 438 on both circumferential sides the fuel cell assembly 410, such that first structural member 436, the second structural member 438, and the one or more cross-supports 440 collectively surround the fuel cell stack 415 and the electrically conducting members 430, 434. In many embodiments, the one or more cross-supports 440 may be formed from a non-conductive, electrically insulating, material.

In some embodiments, one or more brackets 458 may couple the structural members 436, 438 to one of the casing 400 or the combustion liner 402. For example, a first bracket of the one or more brackets 458 may couple the first structural member 436 to the casing 400, and a second bracket of the one or more brackets 458 may couple the second structural member 438 to the casing 400. The one or more brackets 458 may be fixedly coupled to the structural members 436, 438 (e.g., via welding or brazing). Alternatively, the one or more brackets 458 may be integrally formed as a single component with the structural members 436, 438 (e.g., via an additive manufacturing process).

In many embodiments, a fuel reformer or fuel processing unit (FPU) 424 (such as a catalytic partial oxidation convertor, abbreviated as $CPO_x$) may receive a flow of fuel from the fuel source 148 for developing the hydrogen rich fuel stream for the fuel cell stack 415. Particularly, the combustion section 114 may include a first FPU 426 and a second FPU 428 each disposed within the diffusion chamber 406 and fluidly coupled to the fuel source 148 and a respective fuel cell assembly 412, 414. For example, the first FPU 426 may be fluidly coupled to the fuel source 148 and fluidly coupled to the outer fuel cell assembly 412, and the second FPU 428 may be fluidly coupled to the fuel source 148 and fluidly coupled to the inner fuel cell assembly 414. Alternatively, both the first and the second fuel cell assemblies 412, 414 may be fluidly coupled to the same FPU 424. In embodiments in which the fuel source is supplying hydrogen fuel, the FPU 424 may function as a fuel preheater. In other embodiments, in which the fuel source is supplying any other hydrocarbon fuel, the FPU 424 may function as a desulfurizer, a preheater, a fuel reformer, or a combination of all.

The FPU 424 may function as a heat exchanger that thermally couples the fuel flowing therethrough with the air in the diffusion chamber 406. For example, the air in the diffusion chamber 406 may be fluidly isolated from the fuel in the FPU 424 but may flow through and/or around the FPU 424 such that heat energy may be transferred between the fuel from the FPU 424 and the air in the diffusion chamber 406. The first FPU 426 may be disposed in the diffusion chamber 406 forward of the first fuel cell assembly 412, such that the air and the fuel supplied to the first fuel cell assembly 412 flow through the first FPU 426 for a temperature adjustment before being provided to the first fuel cell assembly 412. Particularly, the first FPU 426 may be disposed axially between the swirler assembly 216 and the compressor diffuser nozzle 202 and radially outward of the swirler assembly 216 and the compressor diffuser nozzle 202. Similarly, the second FPU 428 may be disposed in the diffusion chamber 406 forward of the second fuel cell assembly 414, such that the air and the fuel supplied to the second fuel cell assembly 414 flow through the second FPU 428 for a temperature adjustment before being provided to the second fuel cell assembly 414. Particularly, the second FPU 428 may be disposed axially between the swirler assembly 216 and the compressor diffuser nozzle 202 and radially inward of the swirler assembly 216 and the compressor diffuser nozzle 202.

In other exemplary embodiments, the fuel cell assembly 410 may include any other suitable fuel processing unit (e.g., other than the FPU 424). Additionally, or alternatively, the fuel cell assembly 410 may not require a fuel processing unit, e.g., when the combustor of the gas turbine engine 100 (FIG. 1) is configured to burn hydrogen fuel and the fuel delivery assembly 146 (FIG. 1) is configured to provide hydrogen fuel to the integrated fuel cell and combustor assembly 200, and in particular to the fuel cell assembly 410.

The inlet end 418 of the plurality of fuel cells 416 may be in open airflow communication with the diffusion chamber 406 due to the pressure difference between the combustion chamber 404 and the diffusion chamber 406. For example, the pressure in the diffusion chamber 406 may be higher than the pressure in the combustion chamber 404, thereby causing air to flow from the inlet end 418 of the plurality of fuel cells 416 to the outlet end 420. Particularly, the diffusion chamber 406 may be at a first pressure, and the combustion chamber 404 may be at a second pressure lower than the first pressure such that air from the diffusion chamber 406 flows through the fuel cell stack 415 and into the combustion chamber 404.

In certain embodiments, the inlet end 418 of the plurality of fuel cells 416 may be spaced apart from the casing 400 such that an airflow gap 444 is defined between the inlet end 418 and the casing 400. The airflow gap 444 may be defined in the radial direction R and the circumferential direction C. The airflow gap 444 may be sized to allow enough air into each fuel cell of the plurality of fuel cells 414 for power generation. In exemplary embodiments, the at least one structural member 435 may define an air channel 442 that fluidly couples the diffusion chamber 406 and the inlet end 418 of the fuel cell stack 415. For example, in many embodiments, the air channel 442 may be defined in the first structural member 436 and may extend between the passageway 408 and the airflow gap 444, such that the air channel 442 fluidly couples the air flow gap 444 and the passageway 408. The air channel 442 may be disposed radially between the inlet end 418 of the plurality of fuel cells 416 and the casing 400.

Alternatively, or additionally, the combustion section 114 may include an air manifold 462 extending from an inlet in fluid communication with the diffusion chamber 406, through the casing 400, to an outlet in fluid communication with the airflow gap 444. In such embodiments, the inlet end 418 of the plurality of fuel cells 416 may receive air from the air manifold 462. The air manifold 462 may be a tubing, piping, duct, or other fluid conduit that conveys air from the diffusion chamber 406 to the airflow gap 444 to provide the fuel cell stack 415 with air.

Figure 7:
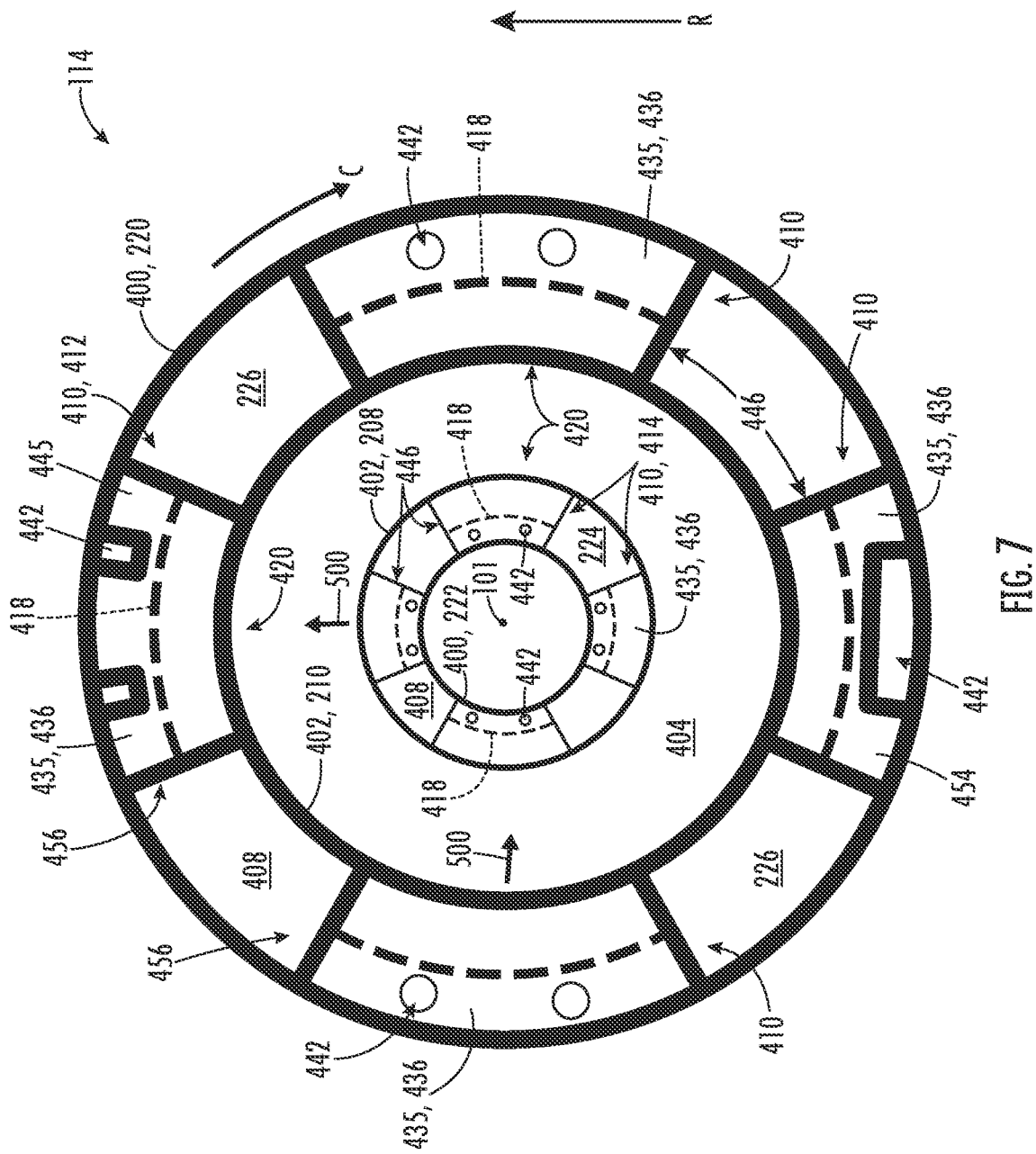
FIG. 7 is a cross-sectional view of the combustion section shown in FIG. 6 taken along the line 7-7 of FIG. 6 in accordance with embodiments of the present disclosure.

Referring now to FIG. 7, a cross-sectional view of the combustion section 114 shown in FIG. 6 taken along the line 7-7 of FIG. 6 is illustrated in accordance with embodiments of the present disclosure. As shown, the fuel cell assembly 410 is a first fuel cell assembly in a plurality of fuel cell assemblies 410 disposed in the passageway 408. The plurality of fuel cell assemblies 410 may be circumferentially spaced apart from one another such that a circumferential gap 446 is defined between each fuel cell assembly 410 of the plurality of fuel cell assemblies 410. For example, the combustion section 114 may include a plurality of outer fuel cell assemblies 412 disposed in the outer passageway 226 and a plurality of inner fuel cell assemblies 414 disposed in the inner passageway 224. As shown in FIG. 7, in some embodiments, each inner fuel cell assembly 414 in the plurality of inner fuel cell assemblies 414 may radially align with a respective outer fuel cell assembly 412 in the plurality of outer fuel cell assemblies 412. Alternatively, or additionally, in other embodiments (not shown), one or more of the inner fuel cell assemblies 414 may not radially align with any of the outer fuel cell assemblies 412, such that the inner and outer fuel cell assemblies 414, 412 may be circumferentially offset from one another.

As shown in FIG. 7, the air channel 442 may have a variety of cross-sectional shapes and/or configurations. For example, in some embodiments, the air channel 442 may have a circular cross section, a rectangular cross section, or other cross-sectional shapes. Additionally, in some embodiments, the first structural member 436 may define a singular air channel 442 that extends circumferentially between two tabs 454. Alternatively, in other embodiments, the first structural member 436 may define a plurality of air channels 442 (such as two or more air channels 442). For the inner fuel cell assemblies 414, as shown, the air channel(s) 442 may be disposed radially inward of the inlet end 418 of the respective plurality of fuel cells 416 (e.g., between the inlet end 418 and the inner casing 222, as shown by the phantom line in FIG. 7). By contrast, for the outer fuel cell assemblies 412, the air channel(s) 442 may be disposed radially outward of the inlet end 418 of the respective plurality of fuel cells 416 (e.g., between the inlet end 418 and the outer casing 220, as shown by the phantom line in FIG. 7).

In some embodiments, the fuel cell assembly 410 may include open circumferential sides 456 that extend axially between the first structural member 436 and the second structural member 438 (FIG. 6) and radially between the casing 400 and the combustion liner 402. In such embodiments, the air from the diffusion chamber 406 (FIG. 6) may flow around (e.g., circumferentially around) the first structural member 436 and into the inlet end 418 of the plurality of fuel cells 416.

Figure 8:
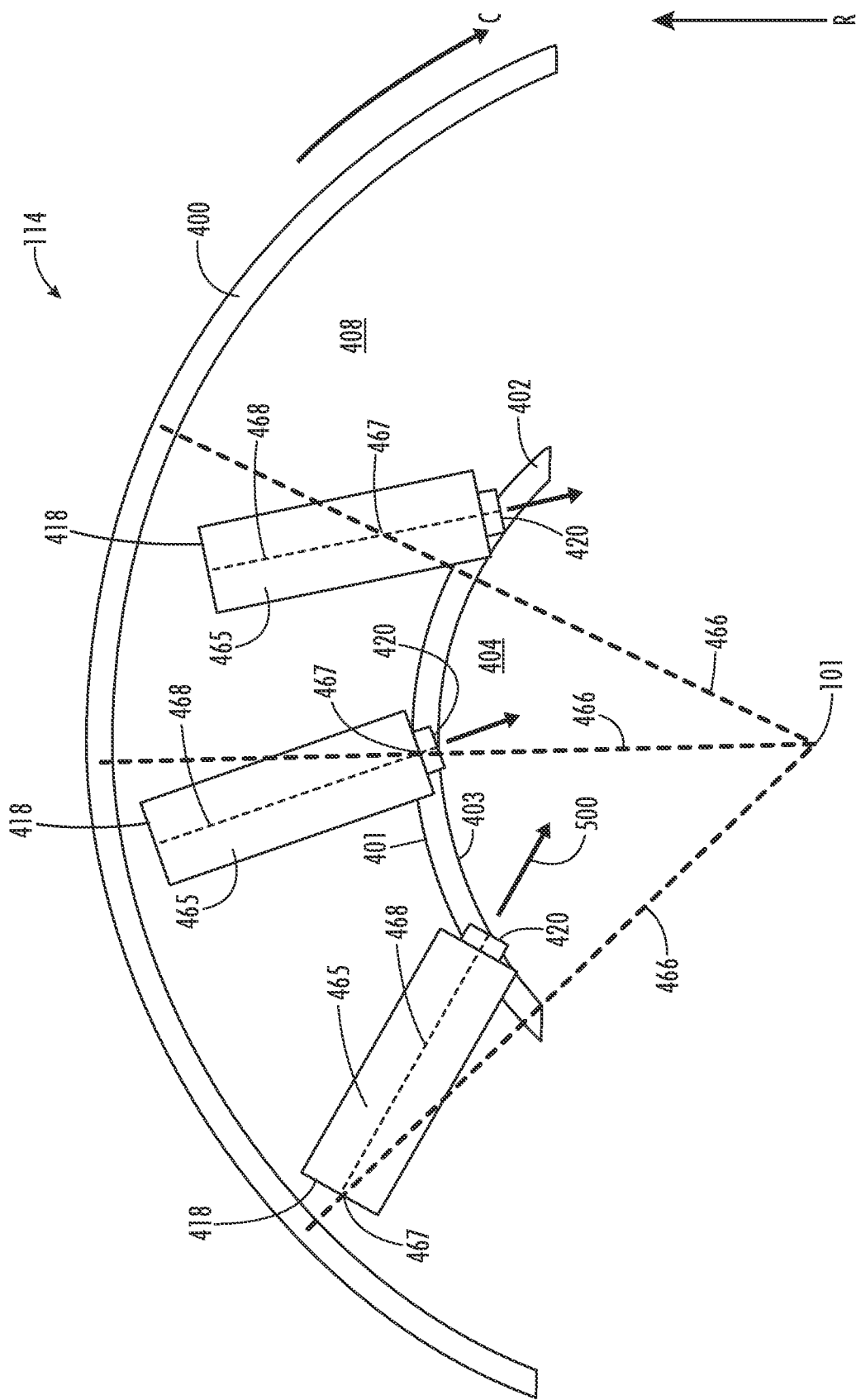
FIG. 8 is an enlarged cross-sectional view of a portion of a combustion section in an axial-circumferential plane in accordance with embodiments of the present disclosure.

Referring now to FIG. 8, an enlarged cross-sectional view of a portion of a combustion section 114 is illustrated in accordance with embodiments of the present disclosure. As shown, the combustion section includes the casing 400 (e.g., the inner casing or the outer casing) and the combustion liner 402 (e.g., the inner liner or the outer liner). The passageway 408 (e.g., the inner or outer passageway) is defined between the casing 400 and the combustion liner 402. The combustion section 114 may further include one or more fuel cells 465 disposed within the passageway 408 and configured to receive air and fuel at an inlet end 418 and provide output products 500 to the combustion chamber 404 via an outlet end 420. The one or more fuel cells 465 shown in FIG. 8 may be one or more of the fuel cells in the plurality of fuel cells 416 of the fuel cell stack 415 described above with reference to FIG. 6. In this way, the one or more fuel cells 465 may be incorporated into the fuel cell assembly 410 described above.

In exemplary embodiments, as shown, the one or more fuel cells 465 may extend at an angle between the inlet end 418 and the outlet end 420 relative to a radial projection line 466. The radial projection line 466 may be an imaginary reference line that extends in the radial direction R. The radial projection line 466 may extend through (or intersect) the centerline axis 101. As shown in FIG. 8, the fuel cell 465 is angled (i.e., sloped or slanted) relative to the radial projection line 466 in an axial-circumferential plane (which is the plane shown in FIG. 8). For example, the fuel cell 465 may extend along a centerline 468, and the fuel cell 465 may be longest along the centerline 468. The centerline 468 may be angled with respect to the radial projection line 466. The fuel cell 465 may extend generally linearly along the centerline 468, such that there are no sudden changes in direction, and such that the centerline 468 defines the same angle with the radial projection line 466 at any point between the inlet end 418 and the outlet end 420 of the fuel cell 465.

In many embodiments, the fuel cell 465 may be angled relative to the radial projection line 466 in the axial-circumferential plane such that the inlet end 418 is circumferentially offset with the outlet end 420. For example, a circumferential gap may be defined between the inlet end 418 and the outlet end 420 of the fuel cell 465 due to the fuel cell 465 being disposed at an angle. In various embodiments, the centerline 468 of the fuel cell 465 may define an angle with the radial projection line 466 in the axial-circumferential plane of between about 0° and about 90°, or such as between about 10° and about 80°, or such as between about 20° and about 70°, or such as between about 30° and about 60°, or such as between about 40° and about 50°. In exemplary embodiments, the centerline 468 of the fuel cell 465 may define an angle with the radial projection line 466 in the axial-circumferential plane of about ±60°.

In various embodiments, as shown in FIG. 8, the fuel cell 465 may intersect the radial projection line 466 at an intersection point 467. The fuel cell 465 may diverge away from the radial projection line 466 as the fuel cell 465 extends away from the intersection point 467. For example, the intersection point 467 may be defined where the centerline 468 and the radial projection line 466 intersect (i.e., the junction between the centerline 468 and the radial projection line 466). In such embodiments, the fuel cell 465 may diverge away from the radial projection line 466 as the fuel cell 465 extends along the centerline 468 away from the intersection point 467.

For example, in some embodiments, the inlet end 418 of the fuel cell 465 may intersect the radial projection line 466 at the intersection point 467, and the fuel cell 465 may diverge away from the radial projection line 466 as the fuel cell extends from the inlet end 418 to the outlet end 420. In other embodiments, the outlet end 420 of the fuel cell 465 intersects the radial projection line 466 at the intersection point 467, and the fuel cell 465 may diverge away from the radial projection line 466 as the fuel cell 465 extends from the outlet end 420 to the inlet end 418. Alternatively, in some embodiments, the intersection point 467 may be between the inlet end 418 and the outlet end 420, such that the fuel cell 465 diverges away from the radial projection line 466 in a first direction between the intersection point 467 and the inlet end 418 and diverges away from the radial projection line 466 in a second direction between the intersection point 467 and the outlet end 420.

In exemplary embodiments, the output products 500 may be delivered into the combustion chamber 404 at the angle such that a swirling flow of combustion gases is induced in the combustion chamber 404. The swirling flow of combustion gases may advantageously increase the fuel consumption efficiency within the combustion chamber 404 by increasing the mixing of the fuel and air.

Figure 9:
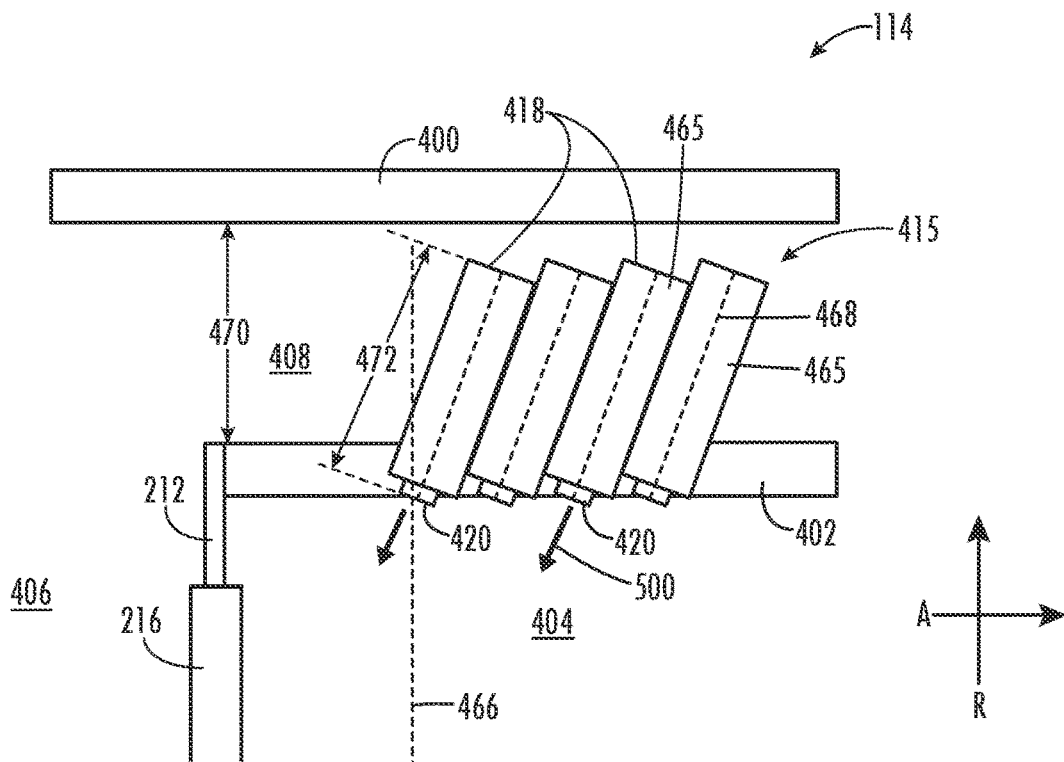
FIG. 9 is an enlarged cross-sectional view of a combustion section in an axial-radial plane in accordance with embodiments of the present disclosure.
Figure 10:
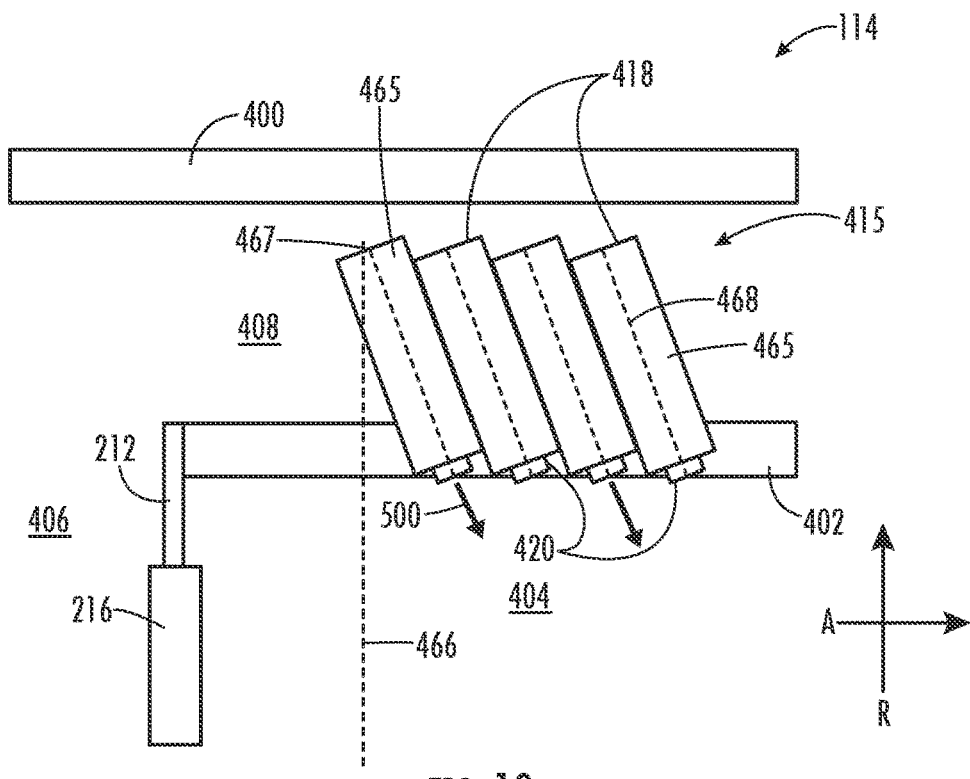
FIG. 10 is an enlarged cross-sectional view of a combustion section in an axial-radial plane in accordance with embodiments of the present disclosure.

Referring now to FIGS. 9 and 10, enlarged cross-sectional views of a combustion section 114 are illustrated in accordance with embodiments of the present disclosure. Particularly, FIGS. 9 and 10 may each illustrate a planar view of the combustion section 114 within an axial-radial plane. As shown in FIGS. 9 and 10, the fuel cell 465 is angled (i.e., sloped or slanted) relative to the radial projection line 466 in the axial-radial plane. For example, the fuel cell 465 may extend along a centerline 468, and the fuel cell 465 may be longest along the centerline 468. The centerline 468 may be angled with respect to the radial projection line 466. The fuel cell 465 may extend generally linearly along the centerline 468, such that there are no sudden changes in direction, and such that the centerline 468 defines the same angle with the radial projection line 466 at any point between the inlet end 418 and the outlet end 420 of the fuel cell 465.

In many embodiments, the fuel cell 465 may be angled relative to the radial projection in the axial-radial plane such that the inlet end 418 is axially offset with the outlet end 420. For example, an axial gap may be defined between the inlet end 418 and the outlet end 420 of the fuel cell 465 due to the fuel cell 465 being disposed at an angle. In various embodiments, the centerline 468 of the fuel cell 465 may define an angle with the radial projection line 466 in the axial-radial plane of between about 0° and about 90°, or such as between about 10° and about 80°, or such as between about 20° and about 70°, or such as between about 30° and about 60°, or such as between about 40° and about 50°.

In some embodiments, as shown in FIG. 9, the fuel cell 465 may be angled towards the swirler assembly 216. In such embodiments, the outlet end 420 may be closer (e.g., axially closer) to the swirler assembly 216 than the inlet end 418, such that that the fuel cell 465 may deliver output products 500 to the combustion chamber 404 at an angle towards the swirler assembly 216. Alternatively, or additionally, as shown in FIG. 10, the fuel cell 465 may be angled away from the swirler assembly 216. In such embodiments, the inlet end 418 may be closer (e.g., axially closer) to the swirler assembly 216 than the outlet end 420, such that the fuel cell 465 delivers output products 500 to the combustion chamber 404 at an angle away from the swirler assembly 216.

In some embodiments, as shown collectively by FIGS. 8 through 10, the fuel cell 465 may be angled relative to the radial projection line 466 in both an axial-radial plane (as shown in FIGS. 9 and 10) and an axial-circumferential plane (as shown in FIG. 8). Angling the fuel cells 465 with respect to the radial direction R may advantageously allow for the fuel cells 465 to be longer, thereby increasing the power output from the entire fuel cell assembly 410. For example, the combustion section 114 may define a radial gap length 470 between the casing 400 and the combustion liner 402. The radial gap length 470 may be measured along the radial direction R between the casing 400 and the combustion liner 402. The fuel cell 465 may define a fuel cell length 472 along the centerline 468. For example, the fuel cell length 472 may be measured along the centerline 468 between the inlet end 418 and the outlet end 420. In exemplary embodiments, the fuel cell length 472 may be longer than the radial gap length 470. For example, the fuel cell length 472 may be between about 1% and about 50% longer than the radial gap length 470, or such as between about 5% and about 50%, or such as between about 10% and about 40%.

In many embodiments, as shown in FIGS. 9 and 10, the fuel cell 465 may be one of a plurality of fuel cells 416 in a fuel cell stack 415. In such embodiments, each fuel cell 465 in the fuel cell stack 415 extends at the angle between the inlet end 418 and the outlet end 420 relative to the radial projection line 466. In some embodiments, as shown, each fuel cell 465 in the fuel cell stack 415 may extend at the same angle between the inlet end 418 and the outlet end 420 relative to the radial projection line 466. In other embodiments (not shown), each fuel cell 465 in the fuel cell stack 415 may extend at a different angle between the inlet end 418 and the outlet end 420 relative to the radial projection line 466.

Figure 11:
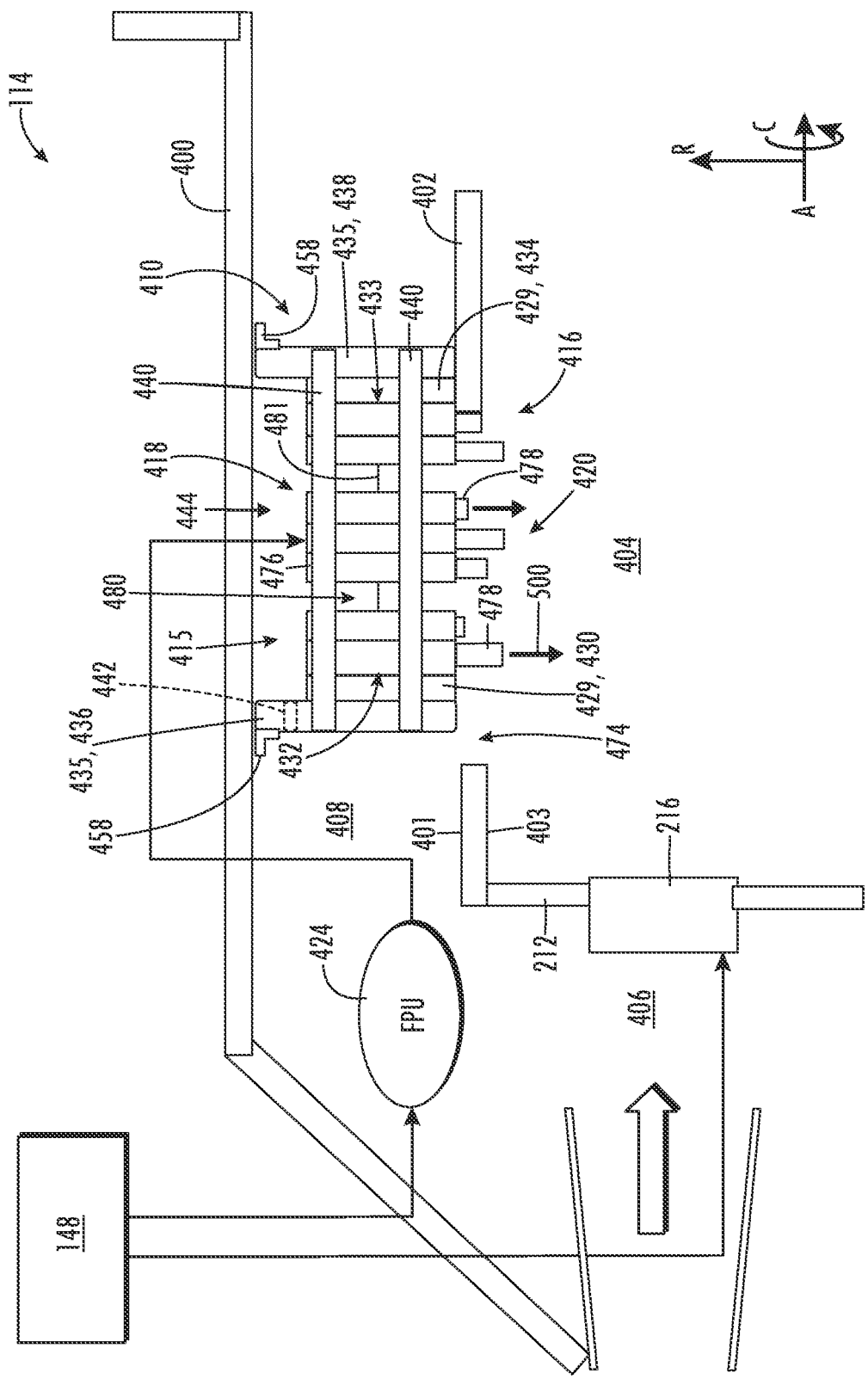
FIG. 11 is an enlarged cross-sectional view of a portion of a combustion section including a fuel cell assembly in accordance with embodiments of the present disclosure.

Referring now to FIG. 11, an enlarged cross-section of a portion of the combustion section 114 is illustrated in accordance with embodiments of the present disclosure. As shown, the combustion section 114 may include a fuel cell assembly 410 positioned within a passageway 408. The fuel cell assembly 410 including the fuel cell stack 415 having a plurality of fuel cells 416 each extending between the inlet end 418 and the outlet end 420. The inlet end 418 may receive a flow of air and fuel and the outlet end 420 may provide output products to the combustion chamber 404. In exemplary embodiments, the outlet end 420 of the plurality of fuel cells 416 may extend through the combustion liner 402 and partially define the combustion chamber 404. For example, the outlet end 420 of the plurality of fuel cells 416 may define a radial flow boundary of the combustion gases within the combustion chamber 404.

The fuel cell assembly 410 may be mounted to at least one of the combustion liner 402 and/or the casing 400. For example, the structural members 436, 438 may extend radially between the casing 400 and the combustion liner 402 and may be coupled to one or both of the casing 400 and the combustion liner 402. For example, the structural member 436, 438 may be fixedly coupled to one or more of the casing 400 and/or the combustion liner 402 (e.g., via welding). Alternatively, or additionally, in some embodiments, one or more brackets 458 may couple the structural members 436, 438 to one of the casing 400 or the combustion liner 402. For example, a first bracket of the one or more brackets 458 may couple the first structural member 436 to the casing 400, and a second bracket of the one or more brackets 458 may couple the second structural member 438 to the casing 400. The one or more brackets 458 may be fixedly coupled to the structural members 436, 438 (e.g., via welding or brazing). Alternatively, the one or more brackets 458 may be integrally formed as a single component with the structural members 436, 438 (e.g., via an additive manufacturing process). Further, the one or more brackets 458 may be fastened to the structural member 436, 438 via one or more fasteners (e.g., threaded fasteners, nut and bolts, etc.).

As described above, fuel cell stack 415 may produce a power output that may be supplied to one or more power converters for use with one or more electrical devices. As such, in exemplary embodiments, the combustion liner 402 may be electrically insulating. For example, the combustion liner 402 may be formed form a non-conductive, electrically insulating, material. Alternatively, the combustion liner 402 may include an electrically insulating coating or wrap. In exemplary embodiments, as shown in FIG. 11, at least one fuel cell in the plurality of fuel cells 416 is one of protruding from the combustion liner 402 into the combustion chamber 404, recessed from the combustion liner 402, or flush with the combustion liner 402. Particularly, the combustion liner 402 may define an interior surface or boundary surface 403 that forms a boundary of the combustion chamber 404. At least one fuel cell in the plurality of fuel cells 416 may extend radially beyond the boundary surface 403 such that the at least one fuel cell terminates within the combustion chamber 404 (e.g., the outlet end 420 of the at least one fuel cell is disposed in the combustion chamber 404). Alternatively, or additionally, at least one fuel cell in the plurality of fuel cells 416 may terminate outside of the combustion chamber 404, such that a radial gap is defined between the boundary surface 403 and the outlet end 420 of the at least one fuel cell. In some embodiments, at least one fuel cell of the plurality of fuel cells 416 may be flush with the combustion liner 402, such that the outlet end 420 of the at least one fuel cell of the plurality of fuel cells 416 is disposed at the radial location of the boundary surface 403. In such embodiments, there may be no radial step between the boundary surface 403 and the outlet end 420 of the at least one fuel cell of the plurality of fuel cells 416, such that the outlet end 420 of the at least one fuel cell may form a continuous surface with the boundary surface 403 of the combustion liner 402.

In some embodiments, each fuel cell in the plurality of fuel cells 416 may include a main body portion 476 and a tip portion 478. The main body portion 476 may extend generally radially between the inlet end 418 and the tip portion 478. The main body portion 476 may terminate at an outer surface 401 of the combustion liner 402. The tip portion 478 may extend generally radially from the main body portion 476 to the outlet end 420. The tip portion 478 may have a smaller width (axially measured) and length (radially measured) than the main body portion 476. The tip portion 478 may protrude into the combustion chamber 404, may be flush with the boundary surface 403 of the combustion liner 402, or may be recessed from the boundary surface 403 of the combustion liner 402.

As shown in FIG. 11, a film cooling gap 474 may be defined between the fuel cell assembly 410 and the combustion liner 402 such that the passageway 408 is in fluid communication with the combustion chamber 404 via the film cooling gap 474. The film cooling gap 474 may be defined axially between the combustion liner 402 and the first structural member 436 of the fuel cell assembly 410, and the film cooling gap 474 may be sized and oriented to promote film cooling of the boundary surface 403 of the combustion liner 402 proximate the outlet end 420 of the plurality of fuel cells 416. In such embodiments, due to the film cooling gap 474, the first structural member 436 and the first electrically conducting member 430 may not contact the combustion liner 402, and as such the radially inward end of both the first structural member 436 and the first electrically conducing member 430 may be film cooled by air from the passageway 408 via the film cooling gap 474.

In many embodiments, the fuel cell assembly 410 may further include a cell cooling channel 480 for cooling one or more fuel cells in the plurality of fuel cells 416. For example, the cell cooling channel 480 may be defined between two adjacent fuel cells in the plurality of fuel cells 416 of the fuel cell stack 415. For example, the cell cooling channel 480 may be defined between a first fuel cell in the plurality of fuel cells 416 and a second fuel cell in the plurality of fuel cells 416. The cell cooling channel 480 may extend radially between the combustion chamber 404 and the airflow gap 444. In such embodiments, an electrical coupling 481 (such as a wire, plate, or other electrical coupling) may extend across (or around) the cell cooling channel 480 to electrically couple the fuel cells in the fuel cell stack 415 to one another.

Figure 12:
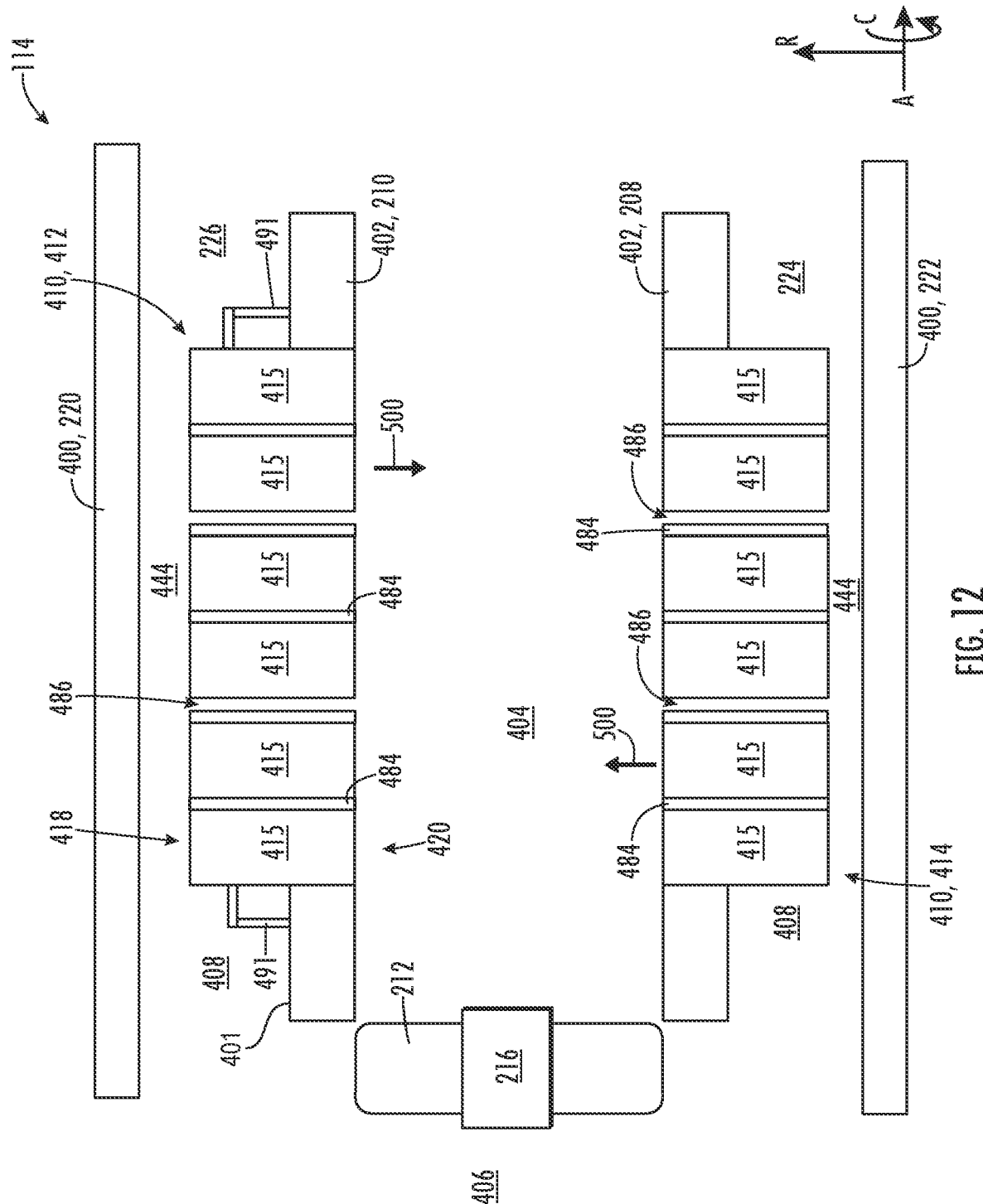
FIG. 12 is a cross-sectional view of a combustion section including a plurality fuel cell stacks in a fuel cell assembly in accordance with embodiments of the present disclosure.

Referring now to FIG. 12, an enlarged cross-section of a portion of the combustion section 114 is illustrated in accordance with embodiments of the present disclosure. As shown in FIG. 12, the fuel cell assembly 410, including the outer fuel cell assembly 412 and the inner fuel cell assembly 414, may include a plurality of fuel cell stacks 415. The plurality of fuel cell stacks 415 may each include a plurality of fuel cells 416 (as shown in FIG. 6), and the plurality of fuel cell stacks 415 may be coupled to one another via an interconnect plate 484. For example, an interconnect plate 484 may be disposed axially between each fuel cell stack 415 of the plurality of fuel cell stacks 415. In some embodiments, each fuel cell stack 415 of the plurality of fuel cell stacks 415 may be coupled to one another via mechanical means, and one or more fuel cell stack 415 may couple the plurality of fuel cell stacks 415 to the combustion liner 402 and/or the casing 400. Alternatively, each of the fuel cell stacks 415 is independently coupled to the combustion liner 402 and/or the casing 400. The interconnect plate 484 may electrically couple the fuel cell stacks 415 to one another. Alternatively, or additionally, a strap, lead, or wire may be used for electrically coupling the fuel cell stacks 415 to one another. The fuel cell stacks 415 may be electrically coupled to one another in series, parallel, or each connected to a power convertor or electric bus.

In exemplary embodiments, the fuel cell assembly 410 may include a stack cooling channel 486 defined between adjacent fuel cell stacks of the plurality of fuel cell stacks 415. For example, two fuel cell stacks 415 of the plurality of fuel cell stacks 415 may be axially spaced apart from one another such that the stack cooling channel 486 is defined therebetween. Particularly, as shown in FIG. 12, the stack cooling channel 486 may be defined between a first fuel cell stack in the plurality of fuel cell stacks 415 and a second fuel cell stack in the plurality of fuel cell stacks 415. More particularly, the stack cooling channel 486 may be defined between an interconnect plate 484 coupled to the first fuel cell stack in the plurality of fuel cell stacks 415 and a radially extending side surface 488 of the second fuel cell stack of the plurality of fuel cell stacks 415. The stack cooling channel 486 may extend radially between the airflow gap 444 and the combustion chamber 404. In some embodiments, as shown, a mechanical support 491 (such as a bracket, flange, or other mechanical support) may couple the fuel cell assembly 410 to the combustion liner 402 (e.g., to an outer surface 401 of the combustion liner 402).

Referring now to FIG. 13, an enlarged cross-sectional view of the combustion section 114 having a fuel cell assembly 410 is illustrated in accordance with embodiments of the present disclosure. As shown in FIG. 13, each fuel cell 416 of the plurality of fuel cells 416 in the fuel cell stack 415 includes an anode 490, a cathode 494, and an electrolyte 492 (such as a solid electrolyte) disposed between the anode 490 and the cathode 494. As shown in FIG. 13, each fuel cell 416 of the plurality of fuel cells 416 includes a fuel channel 498 at least partially defined by the anode 490 and an air channel 496 at least partially defined by the cathode 494. Additionally, each fuel cell 416 may include a one or more divider walls 502, such as a bipolar plate, (which may be electrically conductive to electrically couple the fuel cells 416 to one another). The fuel channel 498 may be defined axially between the anode 490 and the divider wall 502. Similarly, the air channel 496 may be defined axially between the cathode 494 and the divider wall 502. In some instances, as shown in FIG. 13, a first side of the divider wall 502 may contact the either the first or second electrically conducting member 430, 434 and a second side of the divider wall 502 may define either the air channel 496 or the fuel channel 498. In other instances, as shown, a first side of the divider wall 502 may partially define an air channel 496 of a first fuel cell in the plurality of fuel cells 416, and a second side of the divider wall 502 may partially define a fuel channel 498 of a second fuel cell in the plurality of fuel cells 416.

In exemplary embodiments, the fuel channel 498 may extend from a fuel inlet 504 to a fuel outlet 507 fluidly coupled to the combustion chamber 404. The fuel inlet 504 may be closed, such that air from the airflow gap 444 does not enter the fuel inlet 504. However, the fuel inlet 504 may be fluidly coupled to the fuel source 148 (and/or the FPU 424 as shown in FIG. 6), such that the fuel channel 498 receives a flow of fuel 505 from the fuel source 148 via the fuel inlet 504.

The air channel 496 may extend from an air inlet 506 to an air outlet 508 fluidly coupled to the combustion chamber 404. The air inlet 506 may be in open fluid communication with the airflow gap 444, such that air 510 from the airflow gap 444 may flow freely into the air channel 496. Both the air channel 496 and the fuel channel 498 may extend between the inlet end 418 and the outlet end 420 of the fuel cell 416. The non-utilized air 510 from the air channel 496 and the non-utilized fuel 505 from the fuel channel 498 may collectively make up the outlet products of the fuel cell 416.

In various embodiments, as shown in FIG. 13, the fuel cell assembly 410 may include a thermal barrier coating 512 disposed on the outlet end 420 of at least one fuel cell 416 in the plurality of fuel cells 416. The thermal barrier coating 512 may advantageously thermally insulate the fuel cells 416 from the high temperature combustion gases within the combustion chamber 404, thereby prolonging the life of the fuel cell assembly 410.

In exemplary embodiments, the fuel cell assembly 410 may further include an electrical circuit 514 coupled to the plurality of fuel cells 416 and extending through the casing 400. In certain embodiments, fuel cell assembly 410 may include at least one electrically conducting member 429 at either a forward end 432 or an aft end 433 of the fuel cell stack 415. The electrical circuit 514 may include at least one electrically conducting member 429 disposed at a forward end 432 or an aft end 433 of the fuel cell stack 415. For example, the electrical circuit 514 may include a first electrically conducting member 430 at the forward end 432 of the fuel cell stack 415 and a second electrically conducting member 434 at the aft end 433 of the fuel cell stack 415. The first electrically conducting member 430 may be in contact with a forwardmost fuel cell in the plurality of fuel cells 416, and the second electrically conducting member 434 in contact with an aftmost fuel cell in the plurality of fuel cells 416, such that the fuel cell stack 415 is disposed between (e.g., axially between) the first electrically conducting member 430 and the second electrically conducting member 434. In some embodiments (not shown), the fuel cell assembly 410 may include only a singular electrically conducting member 429 at one of the forward end 432 or the aft end 433 of the fuel cell stack 415.

The first electrically conducting member 430 and/or the second electrically conducting member 434 may be electrically coupled to the plurality of fuel cells 416 in the fuel cell stack 415, to collect or capture a power output of the fuel cell stack 415. For example, the electrical circuit 514 may include anode electrical couplings 516 and cathode electrical couplings 518. The anode electrical couplings 516 may extend between and electrically couple the anode 490 of each fuel cell 416 in the plurality of fuel cells 416 and the electrically conducting members 430, 434. Similarly, the cathode electrical couplings 518 may extend between and electrically couple the cathode 494 of each fuel cell 416 in the plurality of fuel cells 416 and the electrically conducting members 430, 434. The anode electrical couplings 516 and the cathode electrical couplings 518 may be wires or other electrical couplings.

In exemplary embodiments, the electrical circuit 514 may further include a strap 520 electrically coupled to the electrically conducting member 429. For example, a first strap 522 may be electrically coupled to the first electrically conducting member 430, and a second strap 524 may be electrically coupled to the second electrically conducting member 434. The strap 520 may extend from a first end 526 coupled to the electrically conducting member 429, through the casing 400, to a second end 528. The strap may include a first portion 530, a second portion 532, and a connection portion 534. The first portion 530 may extend generally radially from the first end 526, through the casing 400, to the second portion 532. The second portion 532 may extend generally axially from the first portion 530 to the connection portion 534. The connection portion 534 may extend between the second portion 532 and the second end 528. While FIG. 13 illustrates a first strap 522 and a second strap 524 electrically coupled to the fuel cell stack 415, in exemplary embodiments, the fuel cell assembly 410 may only include a singular strap at the forward end 432 of the fuel cell stack 415 (e.g., only the first strap 522). In such embodiments, the second strap 524 may not be necessary, and all the electrical energy may be routed through the first strap 522 to the power convertor 439.

The strap 520 may rigid and welded or otherwise fixedly coupled to the electrically conducting member 429. For example, the first end 526 of the strap 520 may be welded to the electrically conducting member 429. The strap 520 may be formed of stainless steel or other rigid material. The strap 520 being rigid advantageously allows the strap 520 to be positioned through the casing 400 without being damaged during operation of the combustion section 114.

In many embodiments, an electric bus 437 may electrically couple to the strap 520 outside (e.g., radially outside) of the casing 400. For example, the electric bus 437 may electrically couple to the second end 528 of the strap 520 radially outward of the casing 400, such that the electric bus 437 may be disposed outside of the passageway 408. The electric bus 437 may include one or more electrical wires (such as platinum wires or other wires). The electric bus 437 may extend from the second end 528 of the strap 520 to a power convertor 439 (such as the power convertor 324 described above with reference to FIG. 5 or a different power convertor).

During operation, the fuel cell assembly 410 defines a power density. The power density may be the amount of power produced by the fuel cell assembly 410 per unit volume. A highly efficient fuel cell assembly 410 may have a high power density, such that the fuel cell assembly 410 is capable of large power production within a small space or volume. In many embodiments, a radial gap 460 may be defined between the casing 400 and the combustion liner 402, and the radial gap 460 may be sized based on the power density of the fuel cell assembly 410. For example, if the power density is high, then the radial gap 460 may be reduced. In many implementations, the radial gap 460 may be between about 2 inches and about 8 inches, or such as between about 3 inches and about 7 inches, or such as between about 4 inches and about 6 inches, or such as about 5 inches. In some embodiments, the power density may be in a range from 0.25 KW/kg to 5 KW/kg (or 1 KW/L to 10 KW/L).

Figure 14:
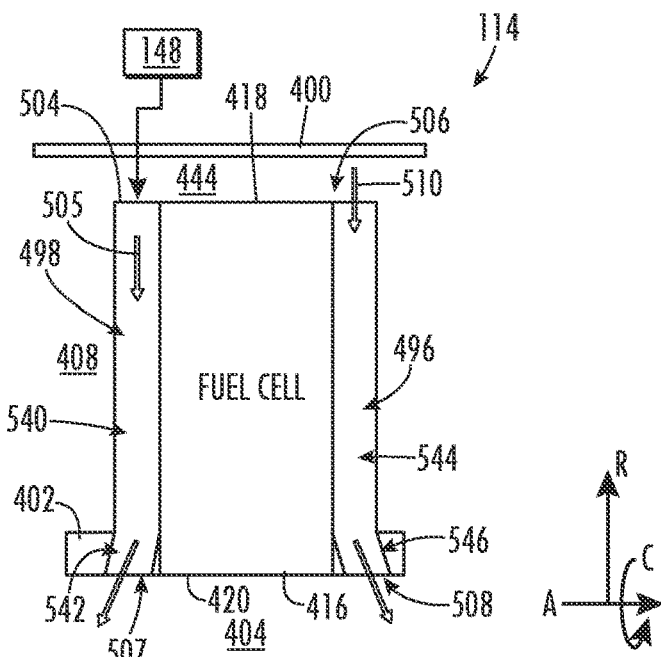
FIG. 14 is an enlarged cross-sectional view of a portion of a combustion section having a fuel cell positioned within a passageway and defining a portion of a combustion chamber is illustrated in accordance with embodiments of the present disclosure.

Referring now to FIG. 14, an enlarged cross-sectional view of a combustion section 114 having a fuel cell 416 positioned within a passageway 408 and defining a portion of the combustion chamber 404 is illustrated in accordance with embodiments of the present disclosure. The fuel cell 416 may be incorporated in the fuel cell assembly 410 described above with reference to FIG. 6 and/or FIG. 12. As shown, the fuel cell 416 may extend from an inlet end 418 to an outlet end 420 and may include a fuel channel 498 and an air channel 496. the fuel channel 498 may extend from a fuel inlet 504 to a fuel outlet 507 fluidly coupled to the combustion chamber 404. The fuel inlet 504 may be closed, such that air from the airflow gap 444 does not enter the fuel inlet 504. However, the fuel inlet 504 may be fluidly coupled to the fuel source 148 (and/or the FPU 424 as shown in FIG. 6), such that the fuel channel 498 receives a flow of fuel 505 from the fuel source 148 via the fuel inlet 504.

The air channel 496 may extend from an air inlet 506 to an air outlet 508 fluidly coupled to the combustion chamber 404. The air inlet 506 may be in open fluid communication with the airflow gap 444, such that air 510 from the airflow gap 444 may flow freely into the air channel 496. Both the air channel 496 and the fuel channel 498 may extend between the inlet end 418 and the outlet end 420 of the fuel cell 416. The non-utilized air 510 from the air channel 496 and the non-utilized fuel 505 from the fuel channel 498 may collectively make up the outlet products of the fuel cell 416.

In exemplary embodiments, as shown in FIG. 14, the fuel outlet 507 and the air outlet 508 may be angled away from one another. For example, the fuel channel 498 may include a straight portion 540 and an angled portion 542. The straight portion 540 may extend generally radially alongside the fuel cell 416 from the fuel inlet 504 to the angled portion 542. The angled portion 542 may extend from the straight portion 540 to the fuel outlet 507. In this way, the fuel outlet 507 may be axially offset from the fuel inlet 504. The angled portion 542 may diverge axially away from the fuel cell 416 as the angled portion 542 extends from the straight portion 540 to the fuel outlet 507.

Similarly, the air channel 496 may include a straight portion 544 and an angled portion 546. The straight portion 544 may extend generally radially alongside the fuel cell 416 from the air inlet 506 to the angled portion 546. The angled portion 546 may extend from the straight portion 544 to the air outlet 508. In this way, the air outlet 508 may be axially offset from the air inlet 506. The angled portion 546 may diverge axially away from the fuel cell 416 as the angled portion 546 extends from the straight portion 544 to the air outlet 508. Particularly, the angled portion 542 of the fuel channel 498 and the angled portion 546 of the air channel 496 may diverge axially away from the fuel cell 416 in opposite directions as the angled portions 542, 546 extend from the respective straight portions 540, 544 to the respective outlets 507, 508.

Figure 15:
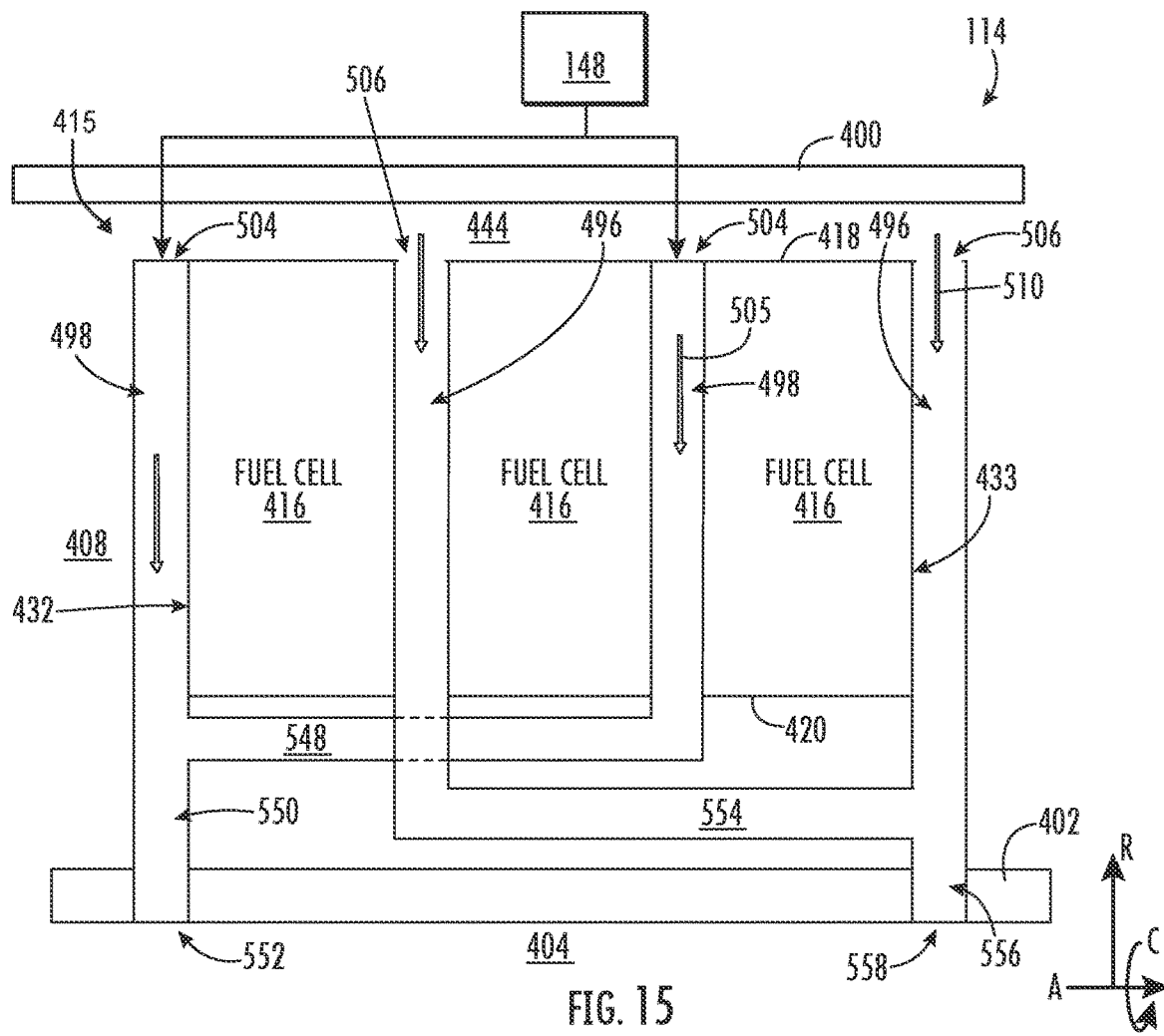
FIG. 15 is an enlarged cross-sectional view of a portion of a combustion section having a fuel cell stack with a plurality of fuel cells positioned within a passageway is illustrated in accordance with embodiments of the present disclosure.

Referring now to FIG. 15, an enlarged cross-sectional view of a combustion section 114 having a fuel cell stack 415 with a plurality of fuel cells 416 positioned within a passageway 408 is illustrated in accordance with embodiments of the present disclosure. The fuel cell stack 415 may be incorporated in the fuel cell assembly 410 described above with reference to FIG. 6 and/or FIG. 12. As shown, the fuel cell stack 415 may extend axially between a forward end 432 and an aft end 433. Additionally, as shown, each of the fuel cells 416 may extend radially from an inlet end 418 to an outlet end 420.

Each of the fuel cells 416 may include a fuel channel 498 and an air channel 496 disposed on opposite sides of the fuel cell 416. Each of the fuel channels 498 may extend from a fuel inlet 504 to a fuel plenum 548, which may collect all the non-utilized fuel 505 from the respective fuel channels 498 of the fuel cells 416. The fuel plenum 548 may be disposed radially between the outlet end 420 of the plurality of fuel cells 416 and the combustion liner 402. In exemplary embodiments, an outlet portion 550 may extend (e.g., generally axially) between the fuel plenum 548 and a common fuel outlet 552 in fluid communication with the combustion chamber 404. The outlet portion 550 and the common fuel outlet 552 may be disposed at one of the forward end 432 or the aft end 433 of the fuel cell stack 415. For example, as shown in FIG. 14, the outlet portion 550 and the common fuel outlet 552 may be disposed at the forward end 432 of the fuel cell stack 415.

Each of the air channels 496 may extend from an air inlet 506 to an air plenum 554, which may collect all the non-utilized air 510 from the respective air channels 496 of the fuel cells 416. The air plenum 554 may be disposed radially between the outlet end 420 of the plurality of fuel cells 416 and the combustion liner 402. In exemplary embodiments, an outlet portion 556 may extend radially (e.g., generally radially) between the air plenum 554 and a common air outlet 558 in fluid communication with the combustion chamber 404. The outlet portion 556 and the common air outlet 558 may be disposed at one of the forward end 432 or the aft end 433 of the fuel cell stack 415. For example, as shown in FIG. 15, the outlet portion 556 and the common air outlet 558 may be disposed at the aft end 433 of the fuel cell stack 415. In this way, the common fuel outlet 552 and the common air outlet 558 may be disposed on axially opposite sides of the fuel cell stack 415, e.g., the common fuel outlet 552 disposed at the forward end 432 and the common air outlet 558 disposed at the aft end 433, which advantageously reduces the interactions between the air and fuel exiting the fuel cell stack 415 by increasing the distance between the flow streams. Particularly, in many embodiments, the common fuel outlet 552 may be disposed at one of a forward end 432 or an aft end 433 of the fuel cell stack 415, and the common air outlet 558 may be disposed at the other of the forward end 432 or the aft end 433 of the fuel cell stack 415.

As discussed above with reference to FIGS. 6-15, the fuel cell stack 415 described herein advantageously leverages the pressure difference between the diffusion chamber 406 and the combustion chamber 408 to produce an airflow path through the fuel cell stack 415. In addition, one or more of the fuel cells 416 in the fuel cell stack 415 may be angled relative to a radial direction R of the combustion section, which allows the one or more fuel cells 416 to extend axially a maximum length for maximum power production from the fuel cell stack 415. Further, the fuel cell stack 415 may advantageously define a portion of the combustion chamber 404 and may include one or more cooling features that provide a cooling flow of air to the combustion liner 400 and/or the fuel cells 416.

The turbomachine of the present disclosure includes a more robust and efficient integration of the fuel cell assembly 410 into the combustion section 114, which advantageously increases the hardware life of the fuel cell assembly 410 and increases the overall efficiency of the turbomachine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells, the plurality of fuel cells extending from an inlet end in fluid communication with the diffusion chamber to an outlet end extending through the combustion liner and in fluid communication with the combustion chamber.

The combustion section of any preceding clause, wherein the inlet end of the plurality of fuel cells is spaced apart from the casing such that an airflow gap is defined between the inlet end and the casing.

The combustion section of any preceding clause, further comprising an air manifold extending from an inlet in fluid communication with the diffusion chamber, through the casing, to an outlet in fluid communication with the airflow gap.

The combustion section of any preceding clause, wherein the diffusion chamber is at a first pressure, and wherein the combustion chamber is at a second pressure lower than the first pressure such that air from the diffusion chamber flows through the fuel cell stack and into the combustion chamber.

The combustion section of any preceding clause, wherein the fuel cell assembly further comprises at least one electrically conducting member disposed at one of a forward end or an aft end of the fuel cell stack.

The combustion section of any preceding clause, wherein the fuel cell assembly further comprises at least one structural member that couples the fuel cell assembly to at least one of the casing or the combustion liner of the combustion section.

The combustion section of any preceding clause, wherein the at least one structural member defines an air channel that fluidly couples the diffusion chamber and the inlet end of the fuel cell stack.

The combustion section of any preceding clause, wherein the air channel defines a circular cross-sectional shape.

The combustion section of any preceding clause, wherein the air channel defines a rectangular cross-sectional shape.

The combustion section of any preceding clause, wherein the at least one structural member defines a singular air channel that extends circumferentially between two tabs.

The combustion section of any preceding clause, wherein the at least one structural member defines a plurality of air channels circumferentially spaced apart from one another.

The combustion section of any preceding clause, wherein the fuel cell assembly defines a power density, wherein a radial gap is defined between the casing and the combustion liner, wherein the radial gap is sized based on the power density of the fuel cell assembly, and wherein the radial gap is between about 2 inches and about 8 inches.

The combustion section of any preceding clause, wherein the fuel cell assembly is a first fuel cell assembly in a plurality of fuel cell assemblies disposed in the passageway, the plurality of fuel cell assemblies circumferentially spaced apart from one another such that a circumferential gap is defined between each fuel cell assembly of the plurality of fuel cell assemblies.

The combustion section of any preceding clause, further comprising a swirler assembly disposed at a forward end of the combustion liner, the swirler assembly fluidly coupled to a fuel source, the diffusion chamber, and the combustion chamber, wherein the fuel cell assembly is disposed aft of the swirler assembly.

A turbomachine comprising: a compressor section, a combustion section, and a turbine section arranged in serial flow order, the combustion section comprising: a casing defining a diffusion chamber that receives air from the compressor section; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells, the plurality of fuel cells extending from an inlet end in fluid communication with the diffusion chamber to an outlet end extending through the combustion liner and in fluid communication with the combustion chamber.

The turbomachine of any preceding clause, wherein the inlet end of the plurality of fuel cells is spaced apart from the casing such that an airflow gap is defined between the inlet end and the casing.

The turbomachine of any preceding clause, further comprising an air manifold extending from an inlet in fluid communication with the diffusion chamber, through the casing, to an outlet in fluid communication with the airflow gap.

The turbomachine of any preceding clause, wherein the diffusion chamber is at a first pressure, and wherein the combustion chamber is at a second pressure lower than the first pressure such that air from the diffusion chamber flows through the fuel cell stack and into the combustion chamber.

The turbomachine of any preceding clause, wherein the fuel cell assembly further comprises at least one electrically conducting member disposed at one of a forward end or an aft end of the fuel cell stack.

The turbomachine of any preceding clause, wherein the fuel cell assembly further comprises at least one structural member that couples the fuel cell assembly to at least one of the casing or the combustion liner of the combustion section.

The turbomachine of any preceding clause, wherein the at least one structural member defines an air channel that fluidly couples the diffusion chamber and the inlet end of the fuel cell stack.

The turbomachine of any preceding clause, wherein the fuel cell assembly defines a power density, wherein a radial gap is defined between the casing and the combustion liner, wherein the radial gap is sized based on the power density of the fuel cell assembly, and wherein the radial gap is between about 2 inches and about 8 inches.

The turbomachine of any preceding clause, wherein the fuel cell assembly is a first fuel cell assembly in a plurality of fuel cell assemblies disposed in the passageway, the plurality of fuel cell assemblies circumferentially spaced apart from one another such that a circumferential gap is defined between each fuel cell assembly of the plurality of fuel cell assemblies.

The turbomachine of any preceding clause, further comprising a swirler assembly disposed at a forward end of the combustion liner, the swirler assembly fluidly coupled to a fuel source, the diffusion chamber, and the combustion chamber, wherein the fuel cell assembly is disposed aft of the swirler assembly.

A combustion section defining an axial direction, a radial direction, and a circumferential direction, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell extending between an inlet end and an outlet end, wherein the inlet end receives a flow of air and fuel and the outlet end provides output products to the combustion chamber, the fuel cell extending at an angle between the inlet end and the outlet end relative to a radial projection line.

The combustion section of any preceding clause, wherein the fuel cell is angled relative to the radial projection line in an axial-radial plane.

The combustion section of any preceding clause, wherein the fuel cell is angled relative to the radial projection line in an axial-circumferential plane.

The combustion section of any preceding clause, wherein the fuel cell is angled relative to the radial projection line in both an axial-radial plane and an axial-circumferential plane.

The combustion section of any preceding clause, wherein the combustion section defines a radial gap length between the casing and the combustion liner, wherein the fuel cell defines a fuel cell length, and wherein the fuel cell length is longer than the radial gap length.

The combustion section of any preceding clause, wherein the fuel cell intersects the radial projection line at an intersection point, and wherein the fuel cell diverges away from the radial projection line as the fuel cell extends away from the intersection point.

The combustion section of any preceding clause, wherein the inlet end of the fuel cell intersects the radial projection line at the intersection point, and wherein the fuel cell diverges away from the radial projection line as the fuel cell extends from the inlet end to the outlet end.

The combustion section of any preceding clause, wherein the outlet end of the fuel cell intersects the radial projection line at the intersection point, and wherein the fuel cell diverges away from the radial projection line as the fuel cell extends from the outlet end to the inlet end.

The combustion section of any preceding clause, wherein the fuel cell is one of a plurality of fuel cells in a fuel cell stack, and wherein each fuel cell in the fuel cell stack extends at the angle between the inlet end and the outlet end relative to the radial projection line.

The combustion section of any preceding clause, wherein the output products are delivered into the combustion chamber at the angle such that a swirling flow of combustion gases is induced in the combustion chamber.

A turbomachine comprising: a compressor section, a combustion section, and a turbine section arranged in serial flow order, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell extending between an inlet end and an outlet end, wherein the inlet end receives a flow of air and fuel and the outlet end provides output products to the combustion chamber, the fuel cell extending at an angle between the inlet end and the outlet end relative to a radial projection line.

The turbomachine of any preceding clause, wherein the fuel cell is angled relative to the radial projection line in an axial-radial plane.

The turbomachine of any preceding clause, wherein the fuel cell is angled relative to the radial projection line in an axial-circumferential plane.

The turbomachine of any preceding clause, wherein the fuel cell is angled relative to the radial projection line in both an axial-radial plane and an axial-circumferential plane.

The turbomachine of any preceding clause, wherein the combustion section defines a radial gap length between the casing and the combustion liner, wherein the fuel cell defines a fuel cell length, and wherein the fuel cell length is longer than the radial gap length.

The turbomachine of any preceding clause, wherein the fuel cell intersects the radial projection line at an intersection point, and wherein the fuel cell diverges away from the radial projection line as the fuel cell extends away from the intersection point.

The turbomachine of any preceding clause, wherein the inlet end of the fuel cell intersects the radial projection line at the intersection point, and wherein the fuel cell diverges away from the radial projection line as the fuel cell extends from the inlet end to the outlet end.

The turbomachine of any preceding clause, wherein the outlet end of the fuel cell intersects the radial projection line at the intersection point, and wherein the fuel cell diverges away from the radial projection line as the fuel cell extends from the outlet end to the inlet end.

The turbomachine of any preceding clause, wherein the fuel cell is one of a plurality of fuel cells in a fuel cell stack, and wherein each fuel cell in the fuel cell stack extends at the angle between the inlet end and the outlet end relative to the radial projection line.

The turbomachine of any preceding clause, wherein the output products are delivered into the combustion chamber at the angle such that a swirling flow of combustion gases is induced in the combustion chamber.

A combustion section defining an axial direction, a radial direction, and a circumferential direction, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells each extending between an inlet end and an outlet end, wherein the inlet end receives a flow of air and fuel and the outlet end provides output products to the combustion chamber, wherein the outlet end of the plurality of fuel cells extends through the combustion liner and partially defines the combustion chamber.

The combustion section of any preceding clause, wherein the fuel cell assembly is mounted to at least one of the combustion liner and the casing.

The combustion section of any preceding clause, wherein the combustion liner is electrically insulating.

The combustion section of any preceding clause, wherein a film cooling gap is defined between the fuel cell assembly and the combustion liner such that the passageway is in fluid communication with the combustion chamber via the film cooling gap.

The combustion section of any preceding clause, wherein at least one fuel cell in the plurality of fuel cells is one of protruding from the combustion liner into the combustion chamber.

The combustion section of any preceding clause, wherein at least one fuel cell in the plurality of fuel cells is recessed from the combustion liner.

The combustion section of any preceding clause, wherein at least one fuel cell in the plurality of fuel cells is flush with the combustion liner.

The combustion section of any preceding clause, wherein a cell cooling channel is defined between a first fuel cell in the plurality of fuel cells and a second fuel cell in the plurality of fuel cells.

The combustion section of any preceding clause, wherein the fuel cell stack is one of a plurality of fuel cell stacks in the fuel cell assembly, and wherein a stack cooling channel is defined between adjacent fuel cell stacks of the plurality of fuel cell stacks.

The combustion section of any preceding clause, wherein a thermal barrier coating is disposed on the outlet end of at least one fuel cell in the plurality of fuel cells.

A turbomachine comprising: a compressor section, a combustion section, and a turbine section arranged in serial flow order, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells each extending between an inlet end and an outlet end, wherein the inlet end receives a flow of air and fuel and the outlet end provides output products to the combustion chamber, wherein the outlet end of the plurality of fuel cells extends through the combustion liner and partially defines the combustion chamber.

The turbomachine of any preceding clause, wherein the fuel cell assembly is mounted to at least one of the combustion liner and the casing.

The turbomachine of any preceding clause, wherein the combustion liner is electrically insulating.

The turbomachine of any preceding clause, wherein a film cooling gap is defined between the fuel cell assembly and the combustion liner such that the passageway is in fluid communication with the combustion chamber via the film cooling gap.

The turbomachine of any preceding clause, wherein at least one fuel cell in the plurality of fuel cells is one of protruding from the combustion liner into the combustion chamber.

The turbomachine of any preceding clause, wherein at least one fuel cell in the plurality of fuel cells is recessed from the combustion liner.

The turbomachine of any preceding clause, wherein at least one fuel cell in the plurality of fuel cells is flush with the combustion liner.

The turbomachine of any preceding clause, wherein a cell cooling channel is defined between a first fuel cell in the plurality of fuel cells and a second fuel cell in the plurality of fuel cells.

The turbomachine of any preceding clause, wherein the fuel cell stack is one of a plurality of fuel cell stacks in the fuel cell assembly, and wherein a stack cooling channel is defined between adjacent fuel cell stacks of the plurality of fuel cell stacks.

The turbomachine of any preceding clause, wherein a thermal barrier coating is disposed on the outlet end of at least one fuel cell in the plurality of fuel cells.

A combustion section defining an axial direction, a radial direction, and a circumferential direction, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells each extending between an inlet end and an outlet end, wherein the inlet end receives a flow of air and fuel and the outlet end provides output products to the combustion chamber, the fuel cell assembly further comprising an electrical circuit electrically coupled to the plurality of fuel cells and extending through the casing.

The combustion section of any preceding clause, wherein the electrical circuit includes an electrically conducting member disposed at one of a forward end or an aft end of the fuel cell stack.

The combustion section of any preceding clause, wherein the fuel cell assembly further comprises at least one structural member that couples the fuel cell assembly to at least one of the casing or the combustion liner of the combustion section.

The combustion section of any preceding clause, wherein the at least one structural member is electrically insulating.

The combustion section of any preceding clause, wherein the electrically conducting member is a first electrically conducting member disposed at one of the forward end or the aft end of the fuel cell stack, and wherein the fuel cell assembly further comprises a second electrically conducting member at the other of the forward end or the aft end of the fuel cell stack.

The combustion section of any preceding clause, wherein the electrical circuit further comprises a strap electrically coupled to the electrically conducting member.

The combustion section of any preceding clause, wherein the strap is rigid and welded to the electrically conducting member.

The combustion section of any preceding clause, wherein the strap extends from the electrically conducting member and through the casing.

The combustion section of any preceding clause, wherein an electric bus electrically couples to the strap outside of the combustor casing.

The combustion section of any preceding clause, wherein the combustion liner is electrically insulating.

A turbomachine comprising: a compressor section, a combustion section, and a turbine section arranged in serial flow order, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells each extending between an inlet end and an outlet end, wherein the inlet end receives a flow of air and fuel and the outlet end provides output products to the combustion chamber, the fuel cell assembly further comprising an electrical circuit electrically coupled to the plurality of fuel cells and extending through the casing.

The turbomachine of any preceding clause, wherein the electrical circuit includes an electrically conducting member disposed at one of a forward end or an aft end of the fuel cell stack.

The turbomachine of any preceding clause, wherein the fuel cell assembly further comprises at least one structural member that couples the fuel cell assembly to at least one of the casing or the combustion liner of the combustion section.

The turbomachine of any preceding clause, wherein the at least one structural member is electrically insulating.

The turbomachine of any preceding clause, wherein the electrically conducting member is a first electrically conducting member disposed at one of the forward end or the aft end of the fuel cell stack, and wherein the fuel cell assembly further comprises a second electrically conducting member at the other of the forward end or the aft end of the fuel cell stack.

The turbomachine of any preceding clause, wherein the electrical circuit further comprises a strap electrically coupled to the electrically conducting member.

The turbomachine of any preceding clause, wherein the strap is rigid and welded to the electrically conducting member.

The turbomachine of any preceding clause, wherein the strap extends from the electrically conducting member and through the casing.

The turbomachine of any preceding clause, wherein an electric bus electrically couples to the strap outside of the combustor casing.

The turbomachine of any preceding clause, wherein the combustion liner is electrically insulating.

A combustion section defining an axial direction, a radial direction, and a circumferential direction, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells each extending between an inlet end and an outlet end, each fuel cell of the plurality of fuel cells comprising an air channel and a fuel channel each fluidly coupled to the combustion chamber.

The combustion section of any preceding clause, wherein the fuel channel extends from a fuel inlet to a fuel outlet fluidly coupled to the combustion chamber, and wherein the air channel extends from an air inlet to an air outlet fluidly coupled to the combustion chamber.

The combustion section of any preceding clause, wherein the fuel outlet and the air outlet are angled away from one another.

The combustion section of any preceding clause, wherein each fuel cell of the plurality of fuel cells comprises an anode, a cathode, and an electrolyte disposed between the anode and the cathode.

The combustion section of any preceding clause, wherein the fuel channel is at least partially defined by the anode.

The combustion section of any preceding clause, wherein the air channel is at least partially defined by the cathode.

The combustion section of any preceding clause, wherein the fuel channel of two or more fuel cells in the plurality of fuel cells each extend from a respective fuel inlet to a fuel plenum, the fuel plenum extending to a common fuel outlet in fluid communication with the combustion chamber.

The combustion section of any preceding clause, wherein each fuel cell of the plurality of fuel cells comprises an air channel at least partially defined by the cathode, and wherein the air channel of two or more fuel cells in the plurality of fuel cells each extend from a respective air inlet to an air plenum, the air plenum extending to a common air outlet in fluid communication with the combustion chamber.

The combustion section of any preceding clause, wherein the common fuel outlet is disposed at one of a forward end or an aft end of the fuel cell stack.

The combustion section of any preceding clause, wherein the common air outlet is disposed at the other of the forward end or the aft end of the fuel cell stack.

A turbomachine comprising: a compressor section, a combustion section, and a turbine section arranged in serial flow order, the combustion section comprising: a casing defining a diffusion chamber; a combustion liner disposed within the diffusion chamber and defining a combustion chamber, the combustion liner spaced apart from the casing such that a passageway is defined between the combustion liner and the casing; and a fuel cell assembly disposed in the passageway, the fuel cell assembly comprising a fuel cell stack having a plurality of fuel cells each extending between an inlet end and an outlet end, each fuel cell of the plurality of fuel cells comprising an air channel and a fuel channel each fluidly coupled to the combustion chamber.

The turbomachine of any preceding clause, wherein the fuel channel extends from a fuel inlet to a fuel outlet fluidly coupled to the combustion chamber, and wherein the air channel extends from an air inlet to an air outlet fluidly coupled to the combustion chamber.

The turbomachine of any preceding clause, wherein the fuel outlet and the air outlet are angled away from one another.

The turbomachine of any preceding clause, wherein each fuel cell of the plurality of fuel cells comprises an anode, a cathode, and an electrolyte disposed between the anode and the cathode.

The turbomachine of any preceding clause, wherein the fuel channel is at least partially defined by the anode.

The turbomachine of any preceding clause, wherein the air channel is at least partially defined by the cathode.

The turbomachine of any preceding clause, wherein the fuel channel of two or more fuel cells in the plurality of fuel cells each extend from a respective fuel inlet to a fuel plenum, the fuel plenum extending to a common fuel outlet in fluid communication with the combustion chamber.

The turbomachine of any preceding clause, wherein each fuel cell of the plurality of fuel cells comprises an air channel at least partially defined by the cathode, and wherein the air channel of two or more fuel cells in the plurality of fuel cells each extend from a respective air inlet to an air plenum, the air plenum extending to a common air outlet in fluid communication with the combustion chamber.

The turbomachine of any preceding clause, wherein the common fuel outlet is disposed at one of a forward end or an aft end of the fuel cell stack.

The turbomachine of any preceding clause, wherein the common air outlet is disposed at the other of the forward end or the aft end of the fuel cell stack.

We claim:

1. A combustion section defining an axial direction, a radial direction, and a circumferential direction, the combustion section comprising:
   a casing defining a diffusion chamber;
   a combustion liner disposed within the diffusion chamber and defining a combustion chamber, the combustion liner spaced apart from the casing such that a passageway is defined between the combustion liner and the casing; and
   a fuel cell assembly disposed in the passageway, the fuel cell assembly comprising a fuel cell stack having a plurality of fuel cells each extending between an inlet end and an outlet end, wherein the inlet end receives a flow of air and fuel and the outlet end provides output products to the combustion chamber, wherein the outlet end of the plurality of fuel cells extends through the combustion liner and partially defines the combustion chamber, wherein a film cooling gap is defined between the outlet end of the plurality of fuel cells and the combustion liner such that the passageway is in fluid communication with the combustion chamber via the film cooling gap.

2. The combustion section as in claim 1, wherein the fuel cell assembly is mounted to at least one of the combustion liner or the casing.

3. The combustion section as in claim 1, wherein the combustion liner is electrically insulating.

4. The combustion section as in claim 1, wherein at least one fuel cell in the plurality of fuel cells is one of protruding from the combustion liner into the combustion chamber.

5. The combustion section as in claim 1, wherein at least one fuel cell in the plurality of fuel cells is recessed from the combustion liner.

6. The combustion section as in claim 1, wherein at least one fuel cell in the plurality of fuel cells is flush with the combustion liner.

7. The combustion section as in claim 1, wherein a cell cooling channel is defined between a first fuel cell in the plurality of fuel cells and a second fuel cell in the plurality of fuel cells.

8. The combustion section as in claim 1, wherein the fuel cell stack is one of a plurality of fuel cell stacks in the fuel cell assembly, and wherein a stack cooling channel is defined between adjacent fuel cell stacks of the plurality of fuel cell stacks.

9. The combustion section as in claim 1, wherein a thermal barrier coating is disposed on the outlet end of at least one fuel cell in the plurality of fuel cells.

10. A turbomachine comprising:
a compressor section, a combustion section, and a turbine section arranged in serial flow order, the combustion section comprising:
a casing defining a diffusion chamber;
a combustion liner disposed within the diffusion chamber and defining a combustion chamber, the combustion liner spaced apart from the casing such that a passageway is defined between the combustion liner and the casing; and
a fuel cell assembly disposed in the passageway, the fuel cell assembly comprising a fuel cell stack having a plurality of fuel cells each extending between an inlet end and an outlet end, wherein the inlet end receives a flow of air and fuel and the outlet end provides output products to the combustion chamber, wherein the outlet end of the plurality of fuel cells extends through the combustion liner and partially defines the combustion chamber, wherein a film cooling gap is defined between the outlet end of the plurality of fuel cells and the combustion liner such that the passageway is in fluid communication with the combustion chamber via the film cooling gap.

11. The combustion section as in claim 1, wherein each fuel cell in the plurality of fuel cells includes a main body portion and a tip portion, and wherein the tip portion is recessed from the combustion liner.

12. The combustion section as in claim 1, wherein the film cooling gap is defined axially between the outlet end of the plurality of fuel cells and the combustion liner.

13. The turbomachine as in claim 10, wherein the fuel cell assembly is mounted to at least one of the combustion liner or the casing.

14. The turbomachine as in claim 10, wherein the combustion liner is electrically insulating.

15. The turbomachine as in claim 10, wherein at least one fuel cell in the plurality of fuel cells is one of protruding from the combustion liner into the combustion chamber.

16. The turbomachine as in claim 10, wherein at least one fuel cell in the plurality of fuel cells is recessed from the combustion liner.

17. The turbomachine as in claim 10, wherein at least one fuel cell in the plurality of fuel cells is flush with the combustion liner.

18. The turbomachine as in claim 10, wherein a cell cooling channel is defined between a first fuel cell in the plurality of fuel cells and a second fuel cell in the plurality of fuel cells.

19. The turbomachine as in claim 10, wherein the fuel cell stack is one of a plurality of fuel cell stacks in the fuel cell assembly, and wherein a stack cooling channel is defined between adjacent fuel cell stacks of the plurality of fuel cell stacks.

20. The turbomachine as in claim 10, wherein a thermal barrier coating is disposed on the outlet end of at least one fuel cell in the plurality of fuel cells.

* * * * *